US008832593B2

(12) United States Patent
Yates et al.

(10) Patent No.: US 8,832,593 B2
(45) Date of Patent: Sep. 9, 2014

(54) SYSTEMS AND METHODS FOR EFFICIENT SPATIAL FEATURE ANALYSIS

(75) Inventors: J. Harlan Yates, Melbourne, FL (US); Mark Rahmes, Melbourne, FL (US); Robert Haden, Rockledge, FL (US); Patricia Brown, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 125 days.

(21) Appl. No.: 13/327,975

(22) Filed: Dec. 16, 2011

(65) Prior Publication Data
US 2013/0159924 A1 Jun. 20, 2013

(51) Int. Cl.
*G06F 3/048* (2013.01)
*G06K 9/46* (2006.01)

(52) U.S. Cl.
USPC .......................... 715/790; 382/195; 715/764

(58) Field of Classification Search
None
See application file for complete search history.

(56) References Cited

U.S. PATENT DOCUMENTS

| 6,476,829 | B1* | 11/2002 | Smith et al. ............. 715/764 |
| 6,720,965 | B1* | 4/2004 | Hirosawa et al. ............. 345/423 |
| 6,970,183 | B1 | 11/2005 | Monroe |
| 7,555,725 | B2* | 6/2009 | Abramson et al. ............. 715/781 |
| 8,341,548 | B2* | 12/2012 | Ernst et al. ............. 715/792 |
| 8,484,223 | B2* | 7/2013 | Ota ............. 707/748 |
| 2002/0033837 | A1* | 3/2002 | Munro ............. 345/654 |
| 2004/0218099 | A1* | 11/2004 | Washington ............. 348/571 |
| 2005/0025357 | A1 | 2/2005 | Landwehr et al. |
| 2005/0047656 | A1 | 3/2005 | Luo et al. |
| 2005/0075544 | A1* | 4/2005 | Shapiro et al. ............. 600/300 |
| 2005/0289109 | A1* | 12/2005 | Arrouye et al. ............. 707/1 |
| 2006/0156254 | A1* | 7/2006 | Satake ............. 715/838 |
| 2006/0200760 | A1* | 9/2006 | Sellers et al. ............. 715/517 |
| 2008/0147366 | A1* | 6/2008 | Schutz et al. ............. 703/8 |
| 2009/0076963 | A1* | 3/2009 | Worthington ............. 705/50 |
| 2009/0138817 | A1* | 5/2009 | Oron et al. ............. 715/788 |
| 2009/0214084 | A1* | 8/2009 | Asner ............. 382/110 |
| 2009/0241043 | A9* | 9/2009 | Balthaser ............. 715/763 |
| 2010/0021012 | A1* | 1/2010 | Seegers et al. ............. 382/113 |

(Continued)

OTHER PUBLICATIONS

Changing the way your search resulsts look—eBay, Oct. 1, 2009.*

(Continued)

*Primary Examiner* — Matt Kim
*Assistant Examiner* — Mahelet Shiberou
(74) *Attorney, Agent, or Firm* — Fox Rothschild LLP; Robert J. Sacco, Esq.

(57) ABSTRACT

Systems (100) and methods (300) for efficient spatial feature data analysis. The methods involve simultaneously generating two or more chip images (904) using image data defining a first image (508); concurrently displaying an array (906) comprising all or a portion of the chip images in a plug-in window (702); and displaying in the plug-in window information relating to an attribute (a1, a2) of a feature ($A_5$) contained in a selected one of the displayed chip images (1002). The chip images are generated in response to a user selection of a feature ($A_1$) contained in at least a portion of the first image displayed in an application window (504). Each of the chip images comprises a panned view, a zoomed view, or a panned-and-zoomed view of the first image including one or more features of a user-selected feature class.

40 Claims, 25 Drawing Sheets

(56) References Cited

U.S. PATENT DOCUMENTS

| | | | |
|---|---|---|---|
| 2010/0070523 A1* | 3/2010 | Delgo et al. | 707/769 |
| 2010/0100835 A1* | 4/2010 | Klaric et al. | 715/765 |
| 2010/0111411 A1* | 5/2010 | Ernst et al. | 382/166 |
| 2010/0306665 A1* | 12/2010 | Milic-Frayling et al. | 715/738 |
| 2011/0173576 A1* | 7/2011 | Murphy et al. | 715/863 |
| 2011/0235858 A1* | 9/2011 | Hanson et al. | 382/103 |
| 2012/0039541 A1 | 2/2012 | Fukui et al. | |
| 2012/0254804 A1* | 10/2012 | Sheha et al. | 715/834 |
| 2012/0316782 A1* | 12/2012 | Sartipi et al. | 701/455 |
| 2013/0120438 A1* | 5/2013 | Shechtman et al. | 345/611 |
| 2013/0124951 A1* | 5/2013 | Shechtman et al. | 715/201 |

OTHER PUBLICATIONS

Deng, J. et al, what does classifying more than 10,000 image categories tell us? Proceedings of the 12th European Conference of Computer Vision (ECCV). 2010. BibTex.

Russakovsky, O., et al, Attribute Learning in Large-scale Datasets. Proceedings of the 12th European Conference of Computer Vision (ECCV), 1st International Workshop on Parts and Attributes. 2010.

Deng, J., et al, ImageNet: A Large-scale Hierarchical Image Database. IEEE Computer Vision and Pattern Recognition (CVPR), 2009.

Deng, J., et al, Construction and Analysis of a Large Scale Image Ontology. In Vision Sciences Society (VSS), 2009.

Information about Related Patents and Patent Applications, see section 6 of the accompanying Information Disclosure Statement Letter, which concerns Related Patents and Patent Applications.

* cited by examiner

SYSTEMS AND METHODS FOR EFFICIENT SPATIAL FEATURE ANALYSIS

BACKGROUND OF THE INVENTION

1. Statement of the Technical Field

The invention concerns computing systems. More particularly, the invention concerns computing systems and methods for efficient spatial feature analysis.

2. Description of the Related Art

There are many known imagery systems that collect and maintain spatial data. Such imagery systems include satellite based systems which collect imagery data covering particular areas of the Earth. The imagery data is typically analyzed for a variety of reasons, such as for surveillance purposes, quality control purposes and/or change detection purposes. The analysis often involves manually analyzing the imagery data over an area of interest. Such manual analysis is often achieved using a computer executing image analysis software (e.g., ESRI® ArcMap® Geospatial Information System ("GIS") software, SOCET SET® software, FALCON-VIEW® software, ADOBE® PHOTOSHOP® software, computer aided design software, and computer aided manufacturing software). In this scenario, only a portion of a high resolution image may be displayed to an operator at any given time. As such, the software provides a pan function and a zoom function. The pan function allows the operator to change a viewport from one part of an image to another part of the image. The zoom function allows the operator to change from a distant view of an image to a more close-up view (zoom in) of the image, and vice versa (zoom out). The pan and zoom operations are typically enabled by the operator using a computer mouse, joy stick and/or gestures.

During the image analysis process, the operator manually inspects the area of interest by: (a) obtaining feature data specifying locations and characteristics of a plurality of objects (e.g., gas stations); (b) "panning" to an area of interest within an image that is supposed to include a visual representation of at least one of the objects; (c) "zooming in" to obtain a close-up view of the area of interest; (d) visually comparing the current image to the feature data to determine if the object is still present in the area of interest and/or has the characteristics defined by the feature data; and (e) repeating steps (a)-(d) for each of the objects indentified by the feature data. Notably, one or more "panning" and/or "zooming" operations may need to be performed to obtain a desired view of the area of interest. Such a manual inspection is time consuming, costly and subject to human error.

SUMMARY OF THE INVENTION

Embodiments of the present invention concern implementing systems and methods for efficient spatial feature data analysis. The methods involve simultaneously generating two or more chip images using image data defining a first image; concurrently displaying an array comprising all or a portion of the chip images in a plug-in window; and displaying in the plug-in window information relating to an attribute of a feature of a selected one of the displayed chip images. The chip images are generated in response to a user selection of a feature contained in at least a portion of the first image displayed in an application window. Each of the chip images comprises a view of one of the features of a user-selected feature class, zoomed-in or zoomed-out depending on user action.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
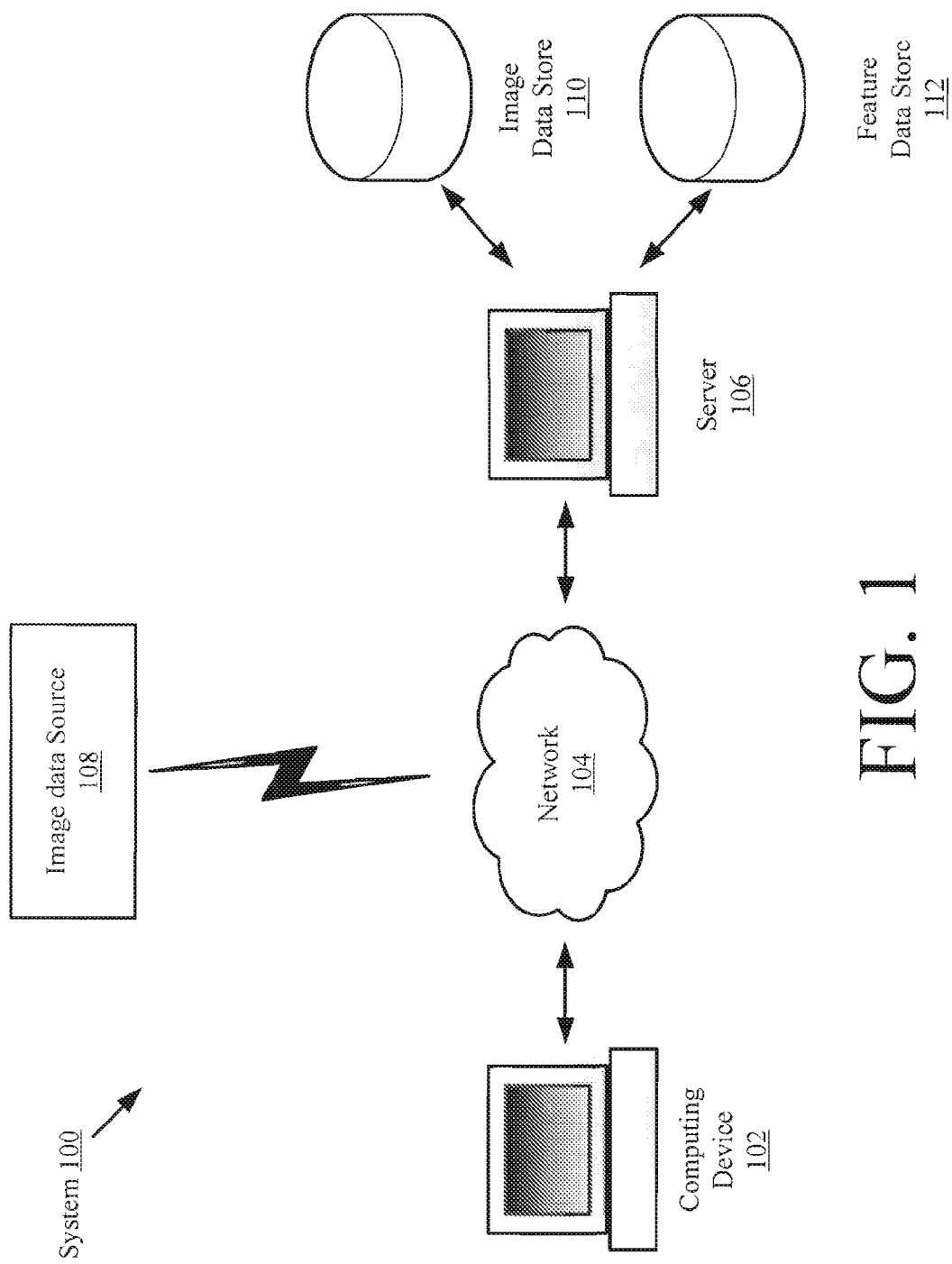
FIG. 1 is a schematic illustration of an exemplary system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for efficient spatial feature data analysis. In this regard, the present invention implements data driven pan operations, data driven zoom operations, and parallel pan/zoom operations for facilitating the simultaneous visual inspection of numerous areas of interest of an image. The listed operations will become more evident as the discussion progresses. Still, it should be understood that the present invention overcomes various drawbacks of conventional spatial feature data analysis techniques, such as those described above in the background section of this document. For example, the present invention provides more efficient, less time consuming and less costly data analysis processes as compared to those of conventional data analysis techniques.

The present invention can be used in a variety of applications. Such applications include, but are not limited to, imagery applications, sensor applications, mapping applications, biometric applications (e.g., fingerprint applications), video applications, geospatial information based applications, medical applications, military applications, photograph applications, graphing applications, charting applications and any other application in which spatial feature data needs to be analyzed. Exemplary implementing system embodiments of the present invention will be described below in relation to FIGS. 1, 2, 5, 7 and 8A-8B. Exemplary method embodiments of the present invention will be described below in relation to FIGS. 3A-32.

Exemplary Systems Implementing the Present Invention

Referring now to FIG. 1, there is provided a block diagram of an exemplary system 100 that is useful for understanding the present invention. The system 100 comprises a computing device 102, a network 104, a server 106, an image data source 108, and at least one data store 110, 112. The system 100 may include more, less or different components than those illustrated in FIG. 1. However, the components shown are sufficient to disclose an illustrative embodiment implementing the present invention.

The hardware architecture of FIG. 1 represents one embodiment of a representative system configured to facilitate feature data maintenance using imagery source for feature display, quality control, and change detection. As such, system 100 implements a method for efficient spatial feature data analysis in accordance with embodiments of the present invention. The method will be described in detail below in relation to FIGS. 3A-32. However, it should be understood that the method implements a data driven approach for enabling an efficient evaluation of geospatial data using imagery data. The phrase "imagery data", as used herein, refers to data defining an image. The image includes, but is not limited to, a two-dimensional representation of at least one object and/or a two-dimensional representation of the spatial distributions of at least one phenomenon. For example, the image is a hand drawn map, a topographical map, a graph, a photograph, a nautical chart, a drawing, a painting, or a computer graphic.

The geospatial data and imagery data can be stored in the same or different data stores. For example, as shown in FIG. 1, the geospatial data is stored in a feature data store 112 and the imagery data is stored in an image data store 110. The imagery data may be any type of imagery data. The imagery data can include, but is not limited to, any spatially organized raster data or similar data (e.g., satellite imagery data, airborne imagery data, digitally rendered map data, gridded terrain data, Light Detection And Ranging ("LIDAR") data, Synthetic Aperture Radar ("SAR") data, and/or scanned data. The imagery data is collected by the image data source 108. The image data source 108 can include, but is not limited to, a satellite, an unmanned aerial vehicle ("UAV"), a plane or a vehicle. Also, the imagery data can be communicated to the data store 110 via network 104 and server 106.

The computing device 102 facilitates spatial feature data analysis. Accordingly, the computing device 102 has installed thereon an Image/Feature Analysis ("IFA") software application and at least one feature analysis plug-in. The IFA software application includes, but is not limited to, ESRI® ArcMap® GIS software, SOCET SET® software, FALCONVIEW® software, ADOBE® PHOTOSHOP® software, Computer Aided Design ("CAD") software, and/or Computer Aided Manufacturing ("CAM") software. Each of the listed IFA software applications is well known in the art, and therefore will not be described in detail herein. However, it should be understood that the IFA software applications facilitate the display of images in an application window. The IFA software applications also facilitate the panning and zooming of the displayed images.

The feature analysis plug-in is a set of software components that adds specific abilities to the IFA software application. For example, the feature analysis plug-in provides the ability to: concurrently and/or simultaneously generate a plurality of chip images using imagery data defining an image; and display all or a portion of the generated chip images in a display area of a plug-in window at the same time. The phrase "chip image", as used herein, refers to a panned and/or zoomed view of an image. A chip image may include one or more features of interest. The term "feature", as used herein, refers to a representation of an object. Such objects include, but are not limited to, bridges, water towers, boats, planes, roads, lakes, buildings, gas stations, restaurants, malls, stores, vehicles, and cisterns. Notably, the chip images may be displayed in the plug-in window in a grid format or a matrix format. In the grid scenario, each cell of a grid includes one chip image. As a result of such a grid arrangement of chip images, a user can perform feature analysis in a shorter period of time as compared to that needed to perform a feature analysis using the conventional technique employed by the IFA software application. This conventional technique generally involves manually panning and zooming to each instance of a feature class.

Figure 2:
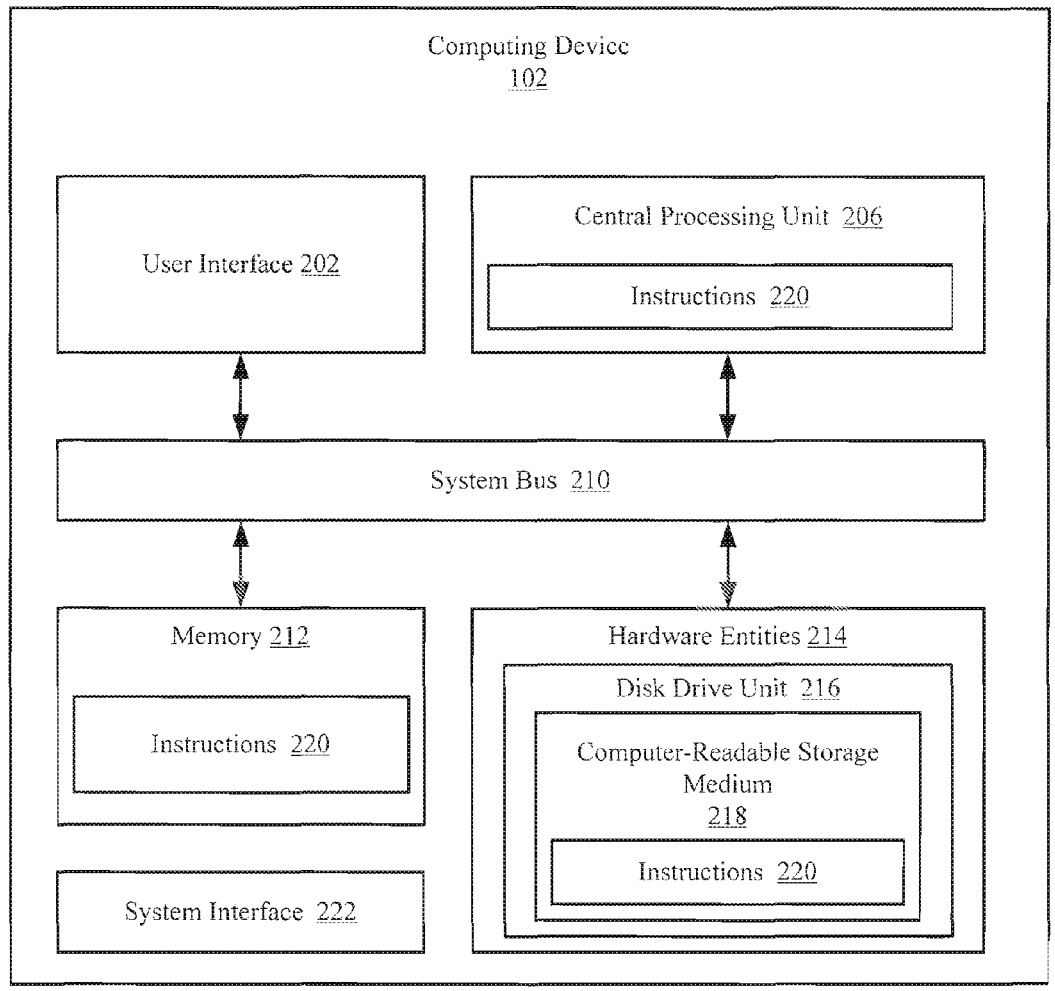
FIG. 2 is a block diagram of an exemplary computing device that is useful for understanding the present invention.

Referring now to FIG. 2, there is provided a block diagram of an exemplary embodiment of the computing device 102. The computing device 102 can include, but is not limited to, a notebook, a desktop computer, a laptop computer, a personal digital assistant, and a tablet PC. The server 106 of FIG. 1 can be the same as or similar to computing device 102. As such, the following discussion of computing device 102 is sufficient for understanding server 106 of FIG. 1. Notably, some or all the components of the computing device 102 can be implemented as hardware, software and/or a combination of hardware and software. The hardware includes, but is not limited to, one or more electronic circuits.

Notably, the computing device 102 may include more or less components than those shown in FIG. 2. However, the components shown are sufficient to disclose an illustrative embodiment implementing the present invention. The hardware architecture of FIG. 2 represents one embodiment of a representative computing device configured to facilitate feature data analysis in an efficient manner. As such, the computing device 102 of FIG. 2 implements improved methods for feature data analysis in accordance with embodiments of the present invention.

As shown in FIG. 2, the computing device 102 includes a system interface 222, a user interface 202, a Central Processing Unit ("CPU") 206, a system bus 210, a memory 212 connected to and accessible by other portions of computing device 102 through system bus 210, and hardware entities 214 connected to system bus 210. At least some of the hardware entities 214 perform actions involving access to and use of memory 212, which can be a Random Access Memory ("RAM"), a disk driver and/or a Compact Disc Read Only Memory ("CD-ROM").

System interface 222 allows the computing device 102 to communicate directly or indirectly with external communication devices (e.g., server 106 of FIG. 1). If the computing device 102 is communicating indirectly with the external communication device, then the computing device 102 is sending and receiving communications through a common network (e.g., the network 104 shown in FIG. 1).

Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 102 and that cause the computing device 102 to perform any one or more of the methodologies of the present disclosure.

In some embodiments of the present invention, the hardware entities 214 include an electronic circuit (e.g., a processor) programmed for facilitating efficient feature data analysis through data-driven spatial sampling and data-driven spatial re-expansion of image data. In this regard, it should be understood that the electronic circuit can access and run IFA software applications (not shown in FIG. 2), feature analysis plug-ins (not shown in FIG. 2) and other types of applications installed on the computing device 102. The IFA software applications are generally operative to facilitate the display of images in an application window, the panning of displayed images, and the zooming of displayed images. The listed functions and other functions implemented by the IFA software applications are well known in the art, and therefore will not be described in detail herein. A schematic illustration of an exemplary application window 504 is provided in FIG. 5.

The feature analysis plug-ins are generally operative to display a plug-in window on a display screen of the computing device 102. A schematic illustration of an exemplary plug-in window 702 is provided in FIG. 7. Various types of information can be presented in the plug-in window. Such information includes, but is not limited to, chip images and feature attributes. The feature attributes can include, but are not limited to, attributes of an object which a feature visually represents (e.g., heights, lengths, diameters, longitudes, latitudes, addresses, names, text and sales volumes).

The feature analysis plug-ins are also operative to perform one or more of: automatically and simultaneously generate a plurality of chip images in response to a user software interaction; generate at least one page of chip images arranged in a grid or matrix format; display pages of chip images in a plug-in window; update a view of an image displayed in an application window to show at least the visual contents of a selected one of a plurality of chip images displayed in a plug-in window; sort a plurality of chip images based on at least one feature attribute; generate and display at least one page of chip images which are arranged in a sorted order; filter chip images based on at least one feature attribute; randomly select and display only a percentage of a plurality of chip images; change a grid size in response to a user software interaction; change a zoom level of scale or resolution of displayed chip images in response to a user software interaction; pan an image displayed in an application window such that a feature of a chip image displayed in a plug-in window is shown in the application window; zoom an image displayed in an application window such that a feature of a chip image is shown at a particular zoom resolution within the application window; cycle through pages of chip images that were generated using a plurality of images; generate and display chip images comprising areas that are common to two or more images; mark chip images in response to user software interactions; unmark chip images in response to user software interactions; and remember various settings that a user sets for each feature class (e.g., bridges, water towers and gas stations) during at least one session. The listed functions and other functions of the feature analysis plug-ins will become more apparent as the discussion progresses. Notably, one or more of the functions of the feature analysis plug-ins can be accessed via a toolbar, menus and other Graphical User Interface ("GUI") elements of the plug-in window.

A schematic illustration of an exemplary toolbar 704 of a plug-in window (e.g., plug-in window 702 of FIG. 7) is provided in FIG. 8A. As shown in FIG. 8A, the toolbar 704 comprises a plurality of exemplary GUI widgets 802-828. Each of the GUI widgets 802-828 is shown in FIG. 8A as a particular type of GUI widget. For example, GUI widget 802 is shown as a drop down menu. Embodiments of the present invention are not limited in this regard. The GUI widgets 802-828 can be of any type selected in accordance with a particular application.

GUI widget 802 is provided to facilitate the display of an array of chip images including features of a user selected feature class (e.g., chimney/smokestack, gas station, restaurant, lake, road, water tower, and building). The array of chip images is displayed in the display area (e.g., display area 706 of FIG. 7) of the plug-in window (e.g., plug-in window 702 of FIG. 7) in a grid format. In the embodiment shown in FIG. 8A, the GUI widget 802 includes, but is not limited to, a drop down list that is populated with the feature classes identified in a previously generated feature list. Drop down lists are well known in the art, and therefore will not be described herein.

GUI widget 804 is provided to facilitate moving through pages of chip images associated with a single feature class. If a selected feature class has more than the maximum number of features that can fit in a grid of the selected grid size (e.g., three cells by three cells), then the feature analysis plug-in generates a plurality of pages of chip images. Each page of chip images includes a grid with chip images contained in the cells thereof. As shown in the embodiment of FIG. 8A, the GUI widget 804 includes, but is not limited to, a text box, a forward arrow button and a backward arrow button. Text boxes and arrow buttons are well known in the art, and therefore will not be described herein. This configuration of the GUI widget 804 allows a user to move forward and backward through the pages of chip images associated with a single image. Paging forward or backward will cause the chip image in an upper left corner grid cell of the new page to be selected. The page context is displayed in the text box as the numerical range of chip images displayed (e.g., chip images one through nine) and the total number of chip images (e.g., twenty) providing visual representations of features of a selected feature class.

GUI widget 806 is provided to facilitate jumping to a desired page of chip images for review. As shown in the embodiment of FIG. 8A, GUI widget 806 includes, but is not limited to, a text box and a search button. The text box is a box in which to enter a page number (e.g., three). Clicking the search button will cause the page of chip images having the entered page number to be displayed in the display area (e.g., display area 706 of FIG. 7) of the plug-in window (e.g., plug-in window 702 of FIG. 7).

GUI widget 808 is provided to facilitate a selection of a grid size from a plurality of pre-defined grid sizes. As shown in FIG. 8A, the GUI widget 808 includes, but is not limited to, a drop down list listing a plurality of pre-defined grid sizes. In some embodiments, the pre-defined grid sizes include one cell by one cell, two cells by two cells, three cells by three cells, four cells by four cells, five cells by five cells, six cells by six cells, seven cells by seven cells, eight cells by eight cells, nine cells by nine cells, and ten cells by ten cells. The grid size of two cells by two cells ensures that a maximum of four chip images will be simultaneously or concurrently displayed in the display area of the plug-in window. The grid size of three cells by three cells ensures that a maximum of nine chip images will be simultaneously or concurrently displayed in the display area of the plug-in window. The grid size of four cells by four cells ensures that a maximum of sixteen chip images will be simultaneously or concurrently displayed in the display area of the plug-in window. The grid size of five cells by five cells ensures that a maximum of twenty-five chip images will be simultaneously or concurrently displayed in the display area of the plug-in window. The grid size of six cells by six cells ensures that a maximum of thirty-six chip images will be simultaneously or concurrently displayed in the display area of the plug-in window. The grid size of seven cells by seven cells ensures that a maximum of forty-nine chip images will be simultaneously or concurrently displayed in the display area of the plug-in window. The grid size of eight cells by eight cells ensures that a maximum of sixty-four chip images will be simultaneously or concurrently displayed in the display area of the plug-in window. The grid size of nine cells by nine cells ensures that a maximum of eight-one chip images will be simultaneously or concurrently displayed in the display area of the plug-in window. The grid size of ten cells by ten cells ensures that a maximum of one hundred chip images will be simultaneously or concurrently displayed in the display area of the plug-in window. Embodiments of the present invention are not limited to grid having an equal number of cells in the rows and columns thereof. For example, a grid can alternatively have a grid size of 4 cells by 3 cells such that each column thereof comprises four cells and each row thereof comprises three cells, or vice versa.

Notably, the display area for each chip image is different for each grid size. For example, the display area for each chip image in a grid having a grid size of two cells by two cells is larger than the display area for each chip image in a grid having a grid size of three cells by three cells. Also, if each chip image has the same zoom level of scale or resolution, then the portion of an image contained in a chip image displayed in a two cell by two cell grid is larger than the portion of an image contained in a chip image displayed in a three cell by three cell grid. It should also be noted that, in some embodiments, a selected chip image of a first grid will reside in an upper left corner cell of a second grid having an enlarged or reduced grid size.

GUI widget 812 is provided to facilitate a selection of features for display in the display area (e.g., display area 706 of FIG. 7) of the plug-in window (e.g., plug-in window 702 of FIG. 7) based on their attributes. As shown in FIG. 8A, the GUI widget 812 includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["HEIGHT"='100 Feet'], ["HEIGHT"<'100 Feet'], ["HEIGHT"< >'100 Feet'], ["HEIGHT" IS NULL], ["HEIGHT" IS NOT NULL], ["HEIGHT"≧'100 Feet' AND "DIAMETER">'40 Feet'], or ["HEIGHT"≦'100 Feet' OR "DIAMETER">'40 Feet']). A schematic illustration of an exemplary drop-down box 850 is provided in FIG. 8B. When the attribute filter function is enabled, the query phrase takes effect immediately.

Notably, the feature analysis plug-in remembers the filter query phrase that a user sets for each feature class during a session. Accordingly, if the user changes a feature class from a first feature class (e.g., bridges) to a second feature class (e.g., water towers) during a session, then the previously set filter query for the second feature class will be restored. Consequently, only features of the second feature class (e.g., water towers) which have the attribute specified in the previously set filter query (e.g., "HEIGHT"='100 Feet') will be displayed in the plug-in window.

GUI widget 814 is provided to facilitate the sorting of chip images based on one or more attributes of the features contained therein. For example, a plurality of chip images are sorted into an ascending or descending order based on the heights and/or diameters of the water towers visually represented by the features contained therein. As shown in FIG. 8A, the GUI widget 814 includes a drop down list. Embodiments of the present invention are not limited in this regard. For example, the GUI widget 814 can alternatively include a button and a drop down arrow for accessing a drop down box. The button facilitates the enablement and disablement of a sorting function of the feature analysis plug-in. The drop down box allows a user to define settings for sorting chip images based on one or more attributes of an active feature class. As such, the drop down box may include a list from which an attribute can be selected from a plurality of attributes. The drop down box may also include widgets for specifying whether the chip images should be sorted in an ascending order or a descending order.

Notably, the feature analysis plug-in remembers the sort settings that a user defines for each feature class during a session. Accordingly, if the user changes a feature class from a first feature class (e.g., bridges) to a second feature class (e.g., water towers) during a session, then the previously defined sort settings for the second feature class will be restored. Consequently, chip images containing features of the second feature class (e.g., water towers) will be displayed in a sorted order in accordance with the previously defined sort settings.

GUI widget 820 is provided to facilitate the display of a random sample of chip images of features of a particular feature class for visual inspection and quality control testing. As such, the GUI widget 820 includes, but is not limited to, a button for enabling/disabling a random sampling function of the feature analysis plug-in and a drop down menu from which a percentage value can be selected.

GUI widget 822 is provided to facilitate the filtering of features which lie outside of an area (e.g., a geographical area) defined either by the area that a plurality of images have in common or by the area covered by a plurality of images taken together. As such, the GUI widget 822 includes, but is not limited to, a button for enabling and disabling an intersection function of the feature analysis plug-in.

GUI widget 810 is provided to facilitate the selection of an image from a plurality of images. As shown in FIG. 8A, the GUI widget 810 includes, but is not limited to, a text box and a drop down list populated with the names of images. If a user selects a new item from the drop down list, then the feature analysis plug-in generates and displays at least one page of chip images using the image indentified by the newly selected item. The chip images contain features of the same feature class as the immediately preceding displayed chip images. The text box displays information identifying the image from which the currently displayed chip images were generated. The contents of the text box can be updated in response to a user selection of a new item from the drop down list. The contents of the text box can also be updated by the feature analysis plug-in during the performance of image cycling operations, which will be described below in relation to GUI widget 824. Accordingly, the information contained in the text box always identifies the image from which the currently displayed chip images were generated.

GUI widget 824 is provided to facilitate the cycling through chip image pages for a plurality of images. A user may want to cycle through such chip image pages for change detection purposes. The GUI widget 824 is configured to allow manual cycling and/or automatic cycling between chip image pages for a plurality of images. As such, the GUI widget 824 includes, but is not limited to, a check box for enabling and disabling image cycling operations of the feature analysis plug-in, a slider for setting the rate at which the images automatically cycle, and/or a button for manually commanding when to change the image.

GUI widget 826 is provided to facilitate the performance of manual-scale operations by the feature analysis plug-in. The manual-scale operations are operative to adjust the zoom level of scale of all of the displayed chip images from a first zoom level of scale to a second zoom level of scale in response to a user-software interaction. The first zoom level of scale is a default zoom level of scale (e.g., 100%) or a previously user-selected zoom level of scale (e.g., 50%). The second zoom level of scale is a new user-selected zoom level of scale (e.g., 75%). As such, the GUI widget 826 includes, but is not limited to, a drop down list populated with a plurality of whole number percentage values. The percentage values include, but are not limited to, whole number values between zero and one hundred.

GUI widget 828 is provided to facilitate the viewing of each displayed feature at its best-fit zoom level of scale or its pre-defined maximum zoom level of scale. As such, the GUI widget 828 includes, but is not limited to, a button for enabling and disabling auto-scale operations of the feature analysis plug-in. When the auto-scale operations are enabled, the manual-scale operations are disabled. Similarly, when the auto-scale operations are disabled, the manual-scale operations are enabled.

GUI widget 830 is provided to facilitate the writing of all "flagged" chip images to an output file stored in a specified data store (e.g., feature data store 112 of FIG. 1). GUI widget 830 is provided to facilitate the saving of all chip images which have been "flagged" during a session to a user-named file. The user-named file can include, but is not limited to, a shapefile. Shapefiles are well known in the art, and therefore will not be described herein. In some embodiments of the present invention, a chip image is "flagged" by right clicking on the chip image to obtain access to a "chip context" GUI and selecting a "flag" item from the "chip context" GUI.

As evident from the above discussion, the system 100 implements one or more method embodiments of the present invention. The method embodiments of the present invention provide implementing systems with certain advantages over conventional data analysis systems. For example, the present invention provides a system in which an analysis of spatial data can be performed in a shorter period of time as compared to the amount of time needed to analyze spatial data using conventional pan/zoom techniques. The present invention also provides a system in which spatial data is analyzed much more efficiently than in conventional spatial data analysis systems. The manner in which the above listed advantages of the present invention are achieved will become more evident as the discussion progresses.

Exemplary Methods of the Present Invention

Figure 3A:
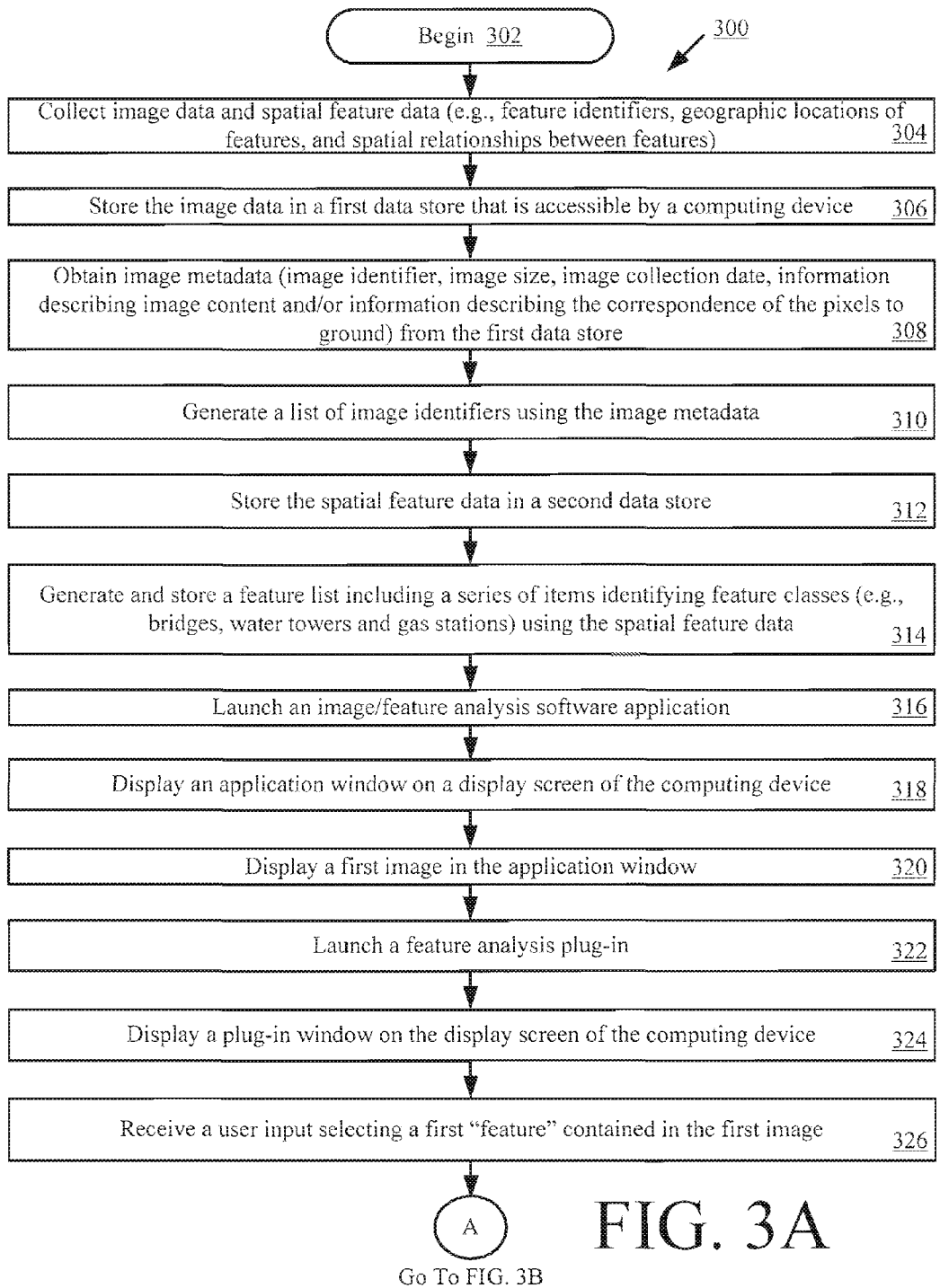
FIGS. 3A-3G collectively provide a flow diagram of an exemplary method for efficient spatial feature data analysis that is useful for understanding the present invention.

Referring now to FIGS. 3A-3G, there is provided a flow diagram of an exemplary method 300 for efficient spatial feature data analysis that is useful for understanding the present invention. As shown in FIG. 3A, the method 300 begins with step 302 and continues with step 304. In step 304, image data and spatial feature data is collected. The spatial feature data can include, but is not limited to, data defining feature identifiers, geographic locations of objects visible in an image, and spatial relationships between the objects.

After the image data is collected, it is stored in a first data store (e.g., data store 110 of FIG. 1) that is accessible by a computing device (e.g., computing device 102 of FIG. 1), as shown by step 306. In a next step 308, image metadata is obtained from the first data store. The image metadata can include, but is not limited to, data defining image identifiers, image sizes, image collection dates, image content, and the correspondence of pixels to ground. The image metadata is then used in step 310 to generate a list of image identifiers. This list of image identifiers will be subsequently used by a feature analysis plug-in to allow a user to select at least one of a plurality of images to analyze at any given time.

Similar to the image data, the spatial feature data is stored in a data store (e.g., data store 112 of FIG. 1) after it is collected. The spatial feature data is used in step 314 to generate a feature list including a series of items identifying feature classes (e.g., bridges, water towers and gas stations). Subsequently, the feature list is stored in the data store (e.g., data store 112 of FIG. 1).

Figure 4:
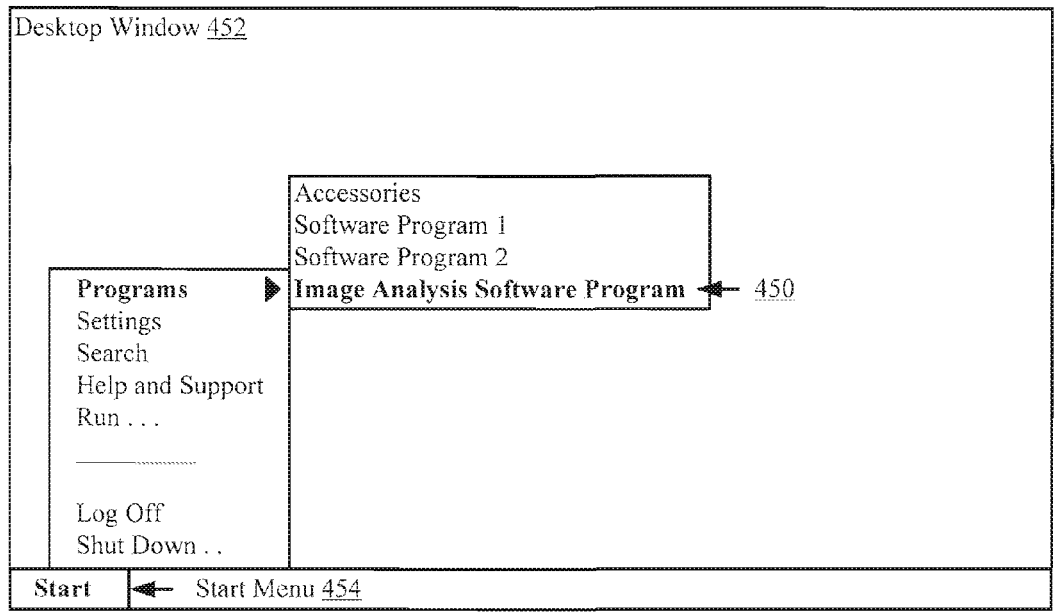
FIG. 4 is a schematic illustration of an exemplary desktop window that is useful for understanding the present invention.

Upon completing step 314, the method continues with step 316 where an IFA software application is launched. The IFA software application can be launched in response to a user software interaction. For example, as shown in FIG. 4, an IFA software application can be launched by accessing and selecting an IFA software application entry 450 on a start menu 454 of a desktop window 452.

Figure 5:
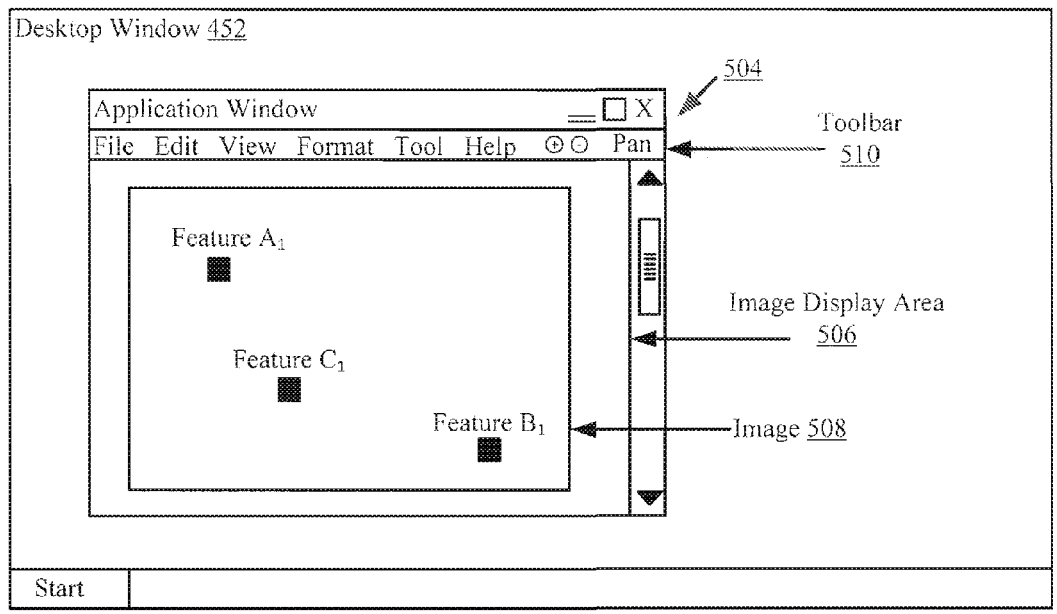
FIG. 5 is a schematic illustration of an exemplary application window that is useful for understanding the present invention.

In a next step 318, an application window is displayed on top of the desktop window. A schematic illustration of an exemplary application window is provided in FIG. 5. As shown in FIG. 5, the application window 504 includes a toolbar 510 including GUI widgets for at least displaying an image, panning an image, zooming an image, and launching a plug-in. The application window 504 also includes an image display area 506 in which an image can be presented to a user of the computing device (e.g., computing device 102 of FIG. 1).

Referring again to FIG. 3A, an image is displayed in the application window, as shown in step 320. A schematic illustration showing an exemplary image 508 displayed in an application window 504 is provided in FIG. 5. The image 508 contains a feature $A_1$ (e.g., a visual representation of a water tower), a feature $B_1$ (e.g., a visual representation of a bridge) and a feature $C_1$ (e.g., a visual representation of a gas station).

Figure 6:
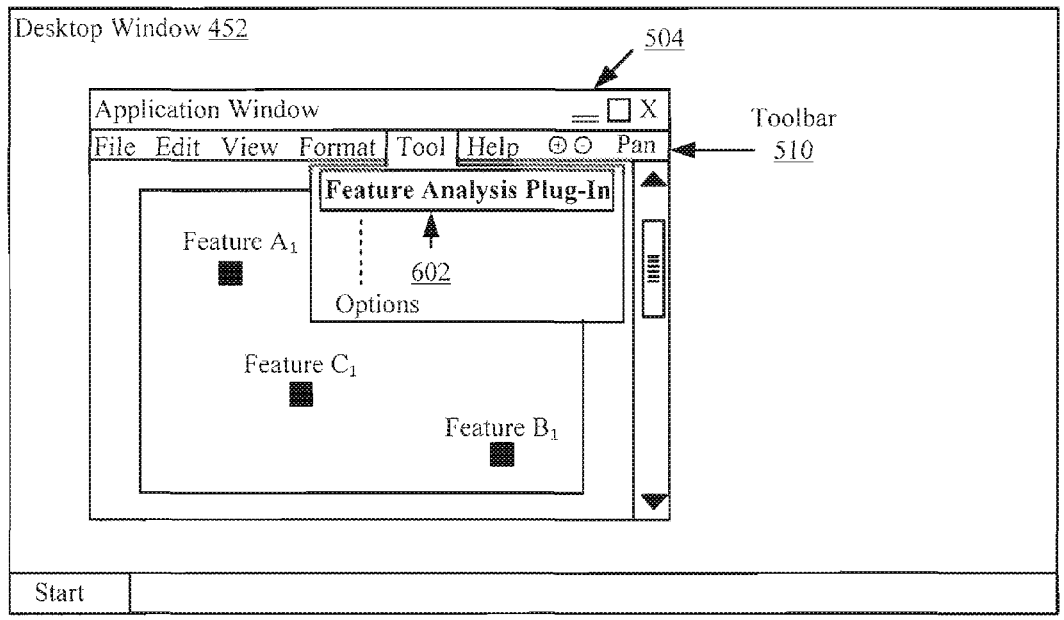
FIG. 6 is a schematic illustration of an exemplary application window that is useful for understanding the present invention.
Figure 7:
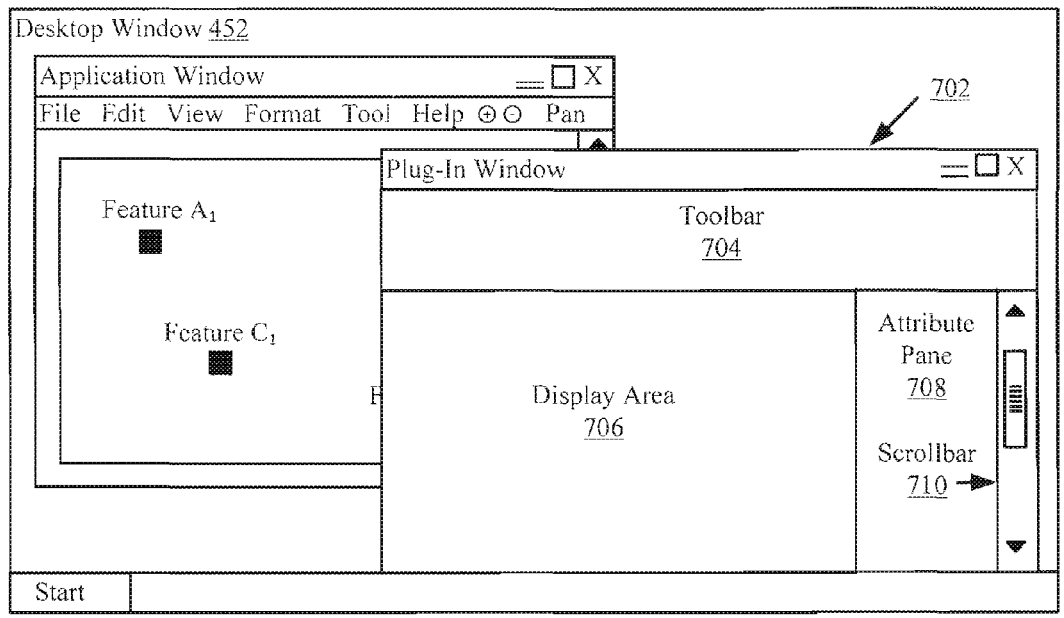
FIG. 7 is a schematic illustration of an exemplary plug-in window that is useful for understanding the present invention.
Figure 8:
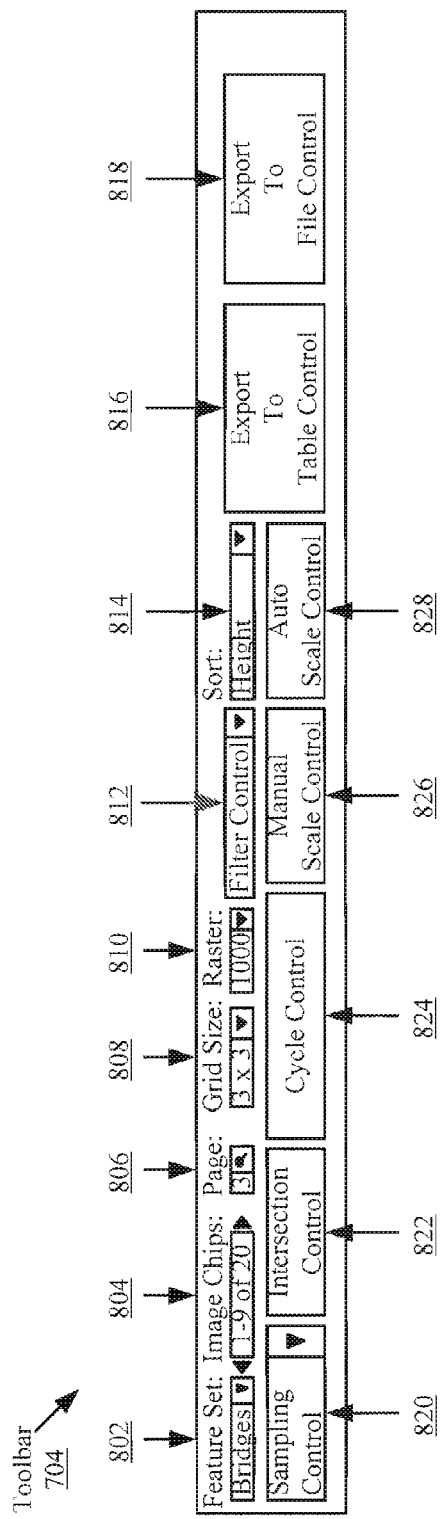
FIG. 8A is a schematic illustration of an exemplary toolbar of a plug-in window that is useful for understanding the present invention.
FIG. 8B is a schematic illustration of an exemplary drop down box that is useful for understanding the present invention.

After the image is presented to a user of the computing device (e.g., computing device 102 of FIG. 1), a feature analysis plug-in is launched, as shown by step 322. The feature analysis plug-in can be launched in response to a user-software interaction. For example, as shown in FIG. 6, a feature analysis plug-in is launched by selecting an item 602 of a drop down menu of a toolbar 510. Once the feature analysis plug-in is launched, step 324 is performed where a plug-in window is displayed on top of the desktop window and/or application window. A schematic illustration of an exemplary plug-in window 702 is provided in FIG. 7. As shown in FIG. 7, the plug-in window 702 comprises a toolbar 704, a display area 706, an attribute pane 708, and a scrollbar 710. A schematic illustration of the toolbar 704 is provided in FIG. 8A. As shown in FIG. 8A, the toolbar 704 comprises a plurality of exemplary GUI widgets 802-828. Each of the GUI widgets 802-828 is described above in detail.

Referring again to FIG. 3A, a next step 326 involves receiving a user input for selecting a first "feature" contained in the first image displayed in the application window. In response to the user-software interaction of step 326, the method 300 continues with step 328 of FIG. 3B.

Figure 3B:
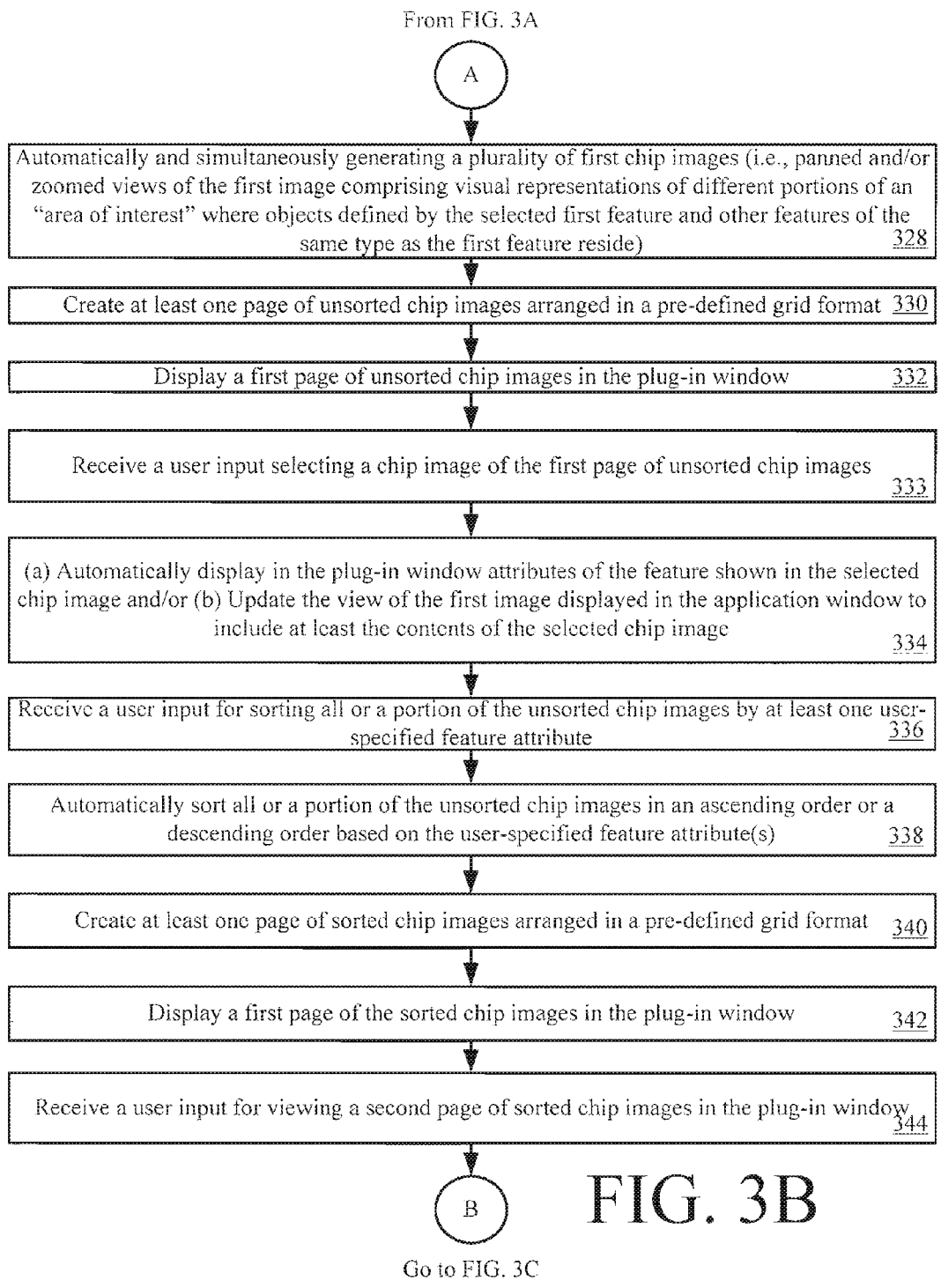

As shown in FIG. 3B, step 328 involves automatically and concurrently generating a plurality of first chip images by the feature analysis plug-in. The first chip images are generated using the feature list generated in previous step 314, the spatial feature data for the features which are of the same type as the first feature selected in previous step 326, and/or the image data for the first image. The first chip images include panned and/or zoomed views of the first image which present visual representations of different portions of an "area of interest" where objects defined by the selected first feature and other features of the same type as the first feature reside. The first chip images can have a default zoom level of scale or resolution. The "area of interest" can be a pre-defined area of interest (e.g., Florida) or a user-specified area of interest (e.g., West Palm Beach, Fla.). The user can specify the "area of interest" by selecting an item from a list or by selecting a portion of the first image.

Figure 9:
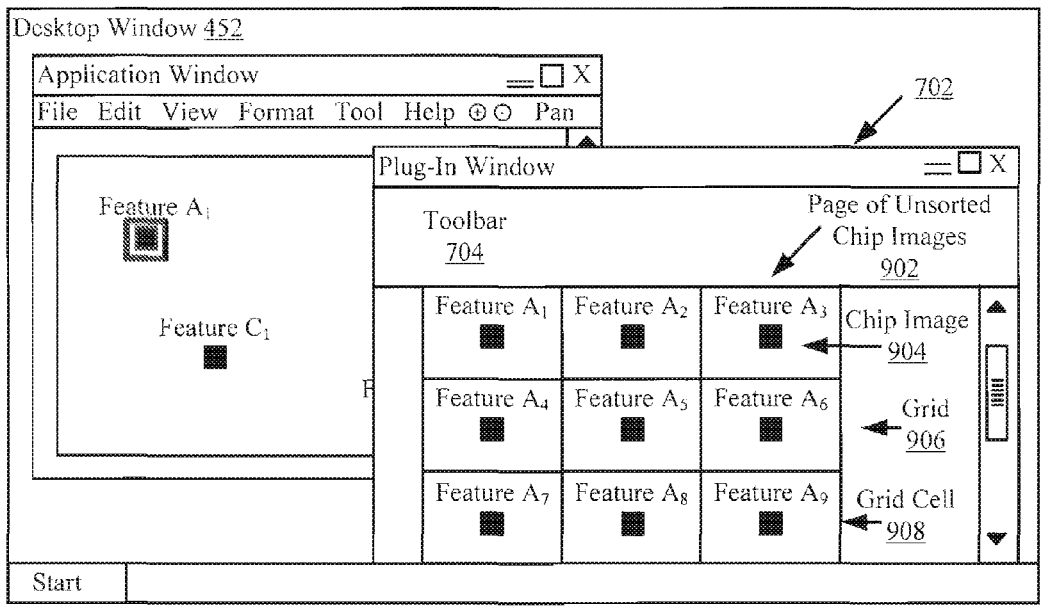
FIG. 9 is schematic illustration of an exemplary displayed page of unsorted chip images that is useful for understanding the present invention.

Upon completing step 328, step 330 is performed where at least one page of unsorted chip images is created by the feature analysis plug-in. The unsorted chip images are arranged on the page in a grid or matrix format. The grid or matrix of the chip images has a default size (e.g., ten cells by ten cells) or a user-specified size (e.g., three cells by three cells). In a next step 332, a first page of the unsorted chip images is displayed in a plug-in window. A schematic illustration of a displayed page of unsorted chip images 902 is provided in FIG. 9. As shown in FIG. 9, the page 902 comprises a grid 906 defined by a plurality of grid cells 908. A different chip image 904 is presented within each grid cell 908 of the grid 906.

Figure 10:
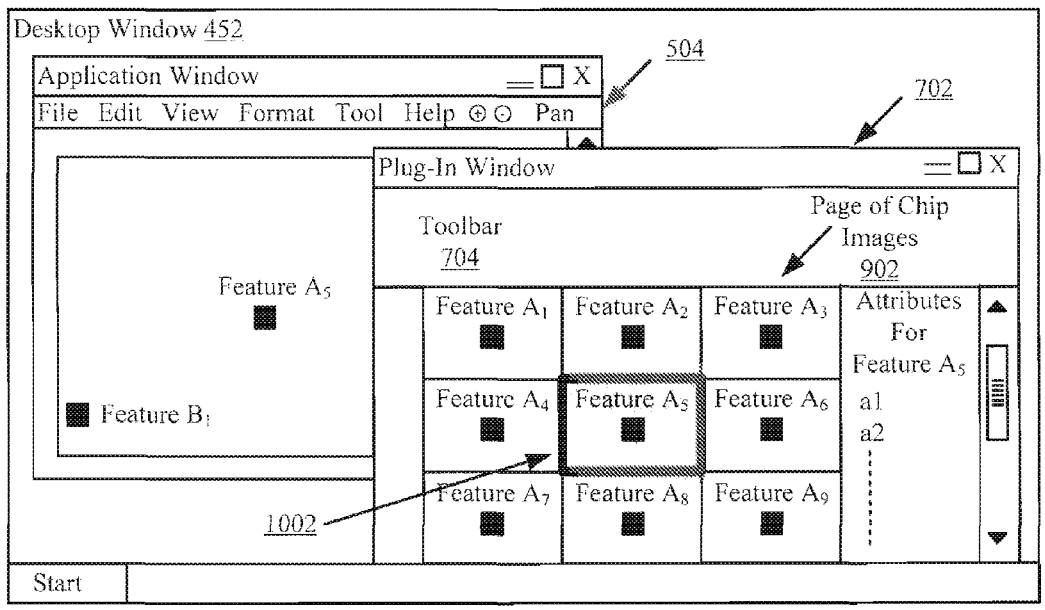
FIG. 10 is a schematic illustration of an exemplary displayed page of chip images that is useful for understanding the present invention.

Referring again to FIG. 3B, the method 300 continues with step 333. In step 333, a user input is received by the computing device for selecting a chip image from the first page of unsorted chip images. The chip image can be selected by moving a mouse cursor over the chip image and clicking a mouse button. A schematic illustration of a selected chip image 1002 is provided in FIG. 10. As shown in FIG. 10, the selected chip image 1002 is annotated with a relatively thick and distinctly colored border. Embodiments of the present invention are not limited in this regard. Any type of mark or annotation can be used to illustrate that a particular chip image has been selected.

In response to this user input, step 334 is performed where attribute information for the feature contained in the selected chip image is displayed in an attribute pane (e.g., attribute pane 708 of FIG. 7) of the plug-in window (e.g., plug-in window 702 of FIG. 7). A schematic illustration of an exemplary plug-in window 702 is provided in FIG. 10 which has attribute information a1, a2 displayed therein.

The first image displayed in the application window may also be updated in step 334 such that the contents of the selected chip image are displayed in the application window. In this regard, the application window can be updated to include a new panned and/or zoomed view of the first image. A schematic illustration of an exemplary updated application window is provided in FIG. 10. As shown in FIG. 10, the application window 504 has displayed therein the feature $A_5$ contained in the selected chip image 1002.

In some embodiments of the present invention, the updated view of the first image is: (a) a panned only view having the same zoom resolution as the original view; or (b) a panned and zoomed view having a zoom resolution that is different than that of the original view, wherein the zoom resolution of the updated view is a default zoom resolution or a user defined zoom resolution. Also, the updated view of the first image may include the feature at a pre-determined location therein, e.g., the center thereof. Embodiments of the present invention are not limited in this regard.

Referring again to FIG. 3B, the method 300 continues with step 336 where a user input is received by the computing device for sorting all or a portion of the unsorted chip images based on at least one attribute of the features contained therein. The user input is facilitated by a GUI widget (e.g., GUI widget 814 of FIG. 8A) of the plug-in window (e.g., the plug-in window 702 of FIG. 7). The GUI widget may be configured to allow a user to specify the attribute(s) that the sorting should be based on, and/or specify whether the chip images should be sorted in an ascending order or a descending order.

Figure 11:
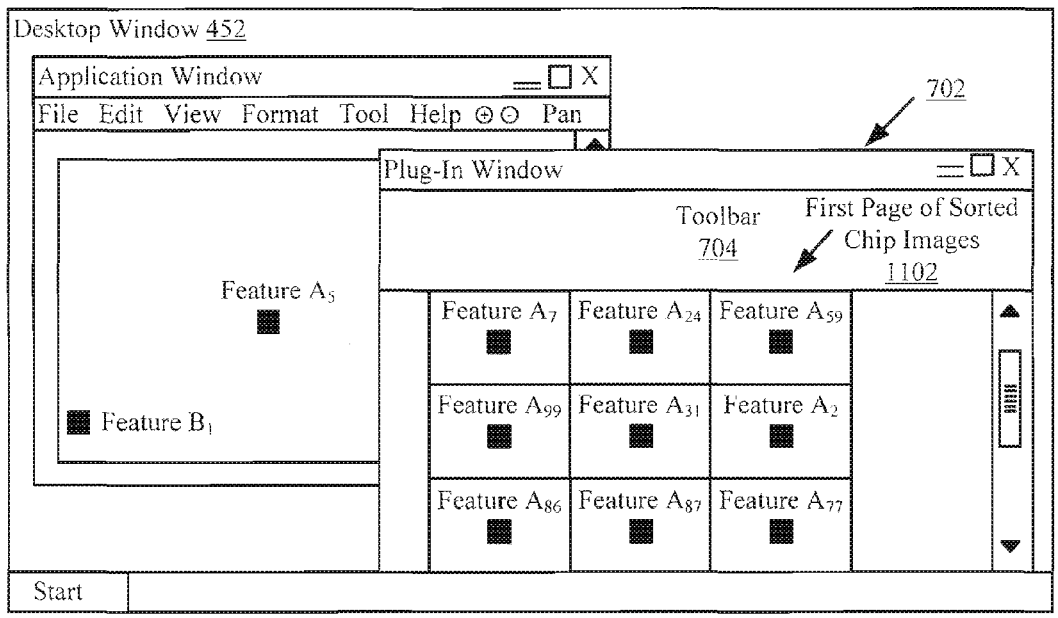
FIG. 11 is a schematic illustration of an exemplary displayed first page of sorted chip images that is useful for understanding the present invention.
Figure 12:
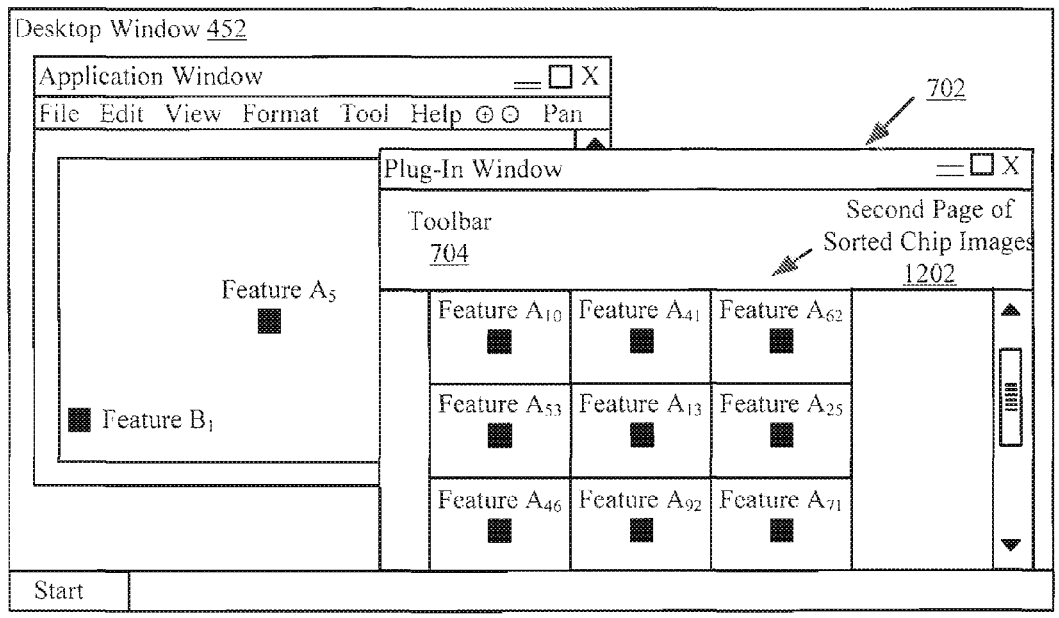
FIG. 12 is a schematic illustration of an exemplary displayed second page of sorted chip images that is useful for understanding the present invention.

In response to the user input of step 336, all or a portion of the unsorted chip images are sorted in an ascending order or a descending order based on the user-specified feature attribute(s), as shown by step 338. Thereafter in step 340, at least one page of sorted chip images is created by the feature analysis plug-in. The sorted chip images are arranged on the page in a pre-defined grid format or a matrix format. A first page of sorted chip images is then displayed in the plug-in window, as shown by step 342. The first page of sorted chip images may or may not include the same views as the first page of unsorted chip images. For example, if the first grid has a grid size of three cells by three cells, then views one through nine of one hundred panned and/or zoomed views are presented therein. Thereafter, an ordered list is generated by sorting the one hundred panned and/or zoomed views by at least one attribute (e.g., height). In this scenario, the first grid is updated to include the first nine views identified in the ordered list. These first nine views of the ordered list may include one or more of the original unsorted views (e.g., views 1-9), as well as one or more views (e.g., views 10-100) different than the original unsorted views. A schematic illustration of an exemplary first page of sorted chip images 1102 is provided in FIG. 11. As shown in FIG. 11, the first page of sorted chip images 1102 includes two of the same chip images as those contained in the first page of unsorted chip images 902. Embodiments of the present invention are not limited in this regard. For example, the first page of sorted chip images 1102 can include none of the chip images contained in the first page of unsorted chip images 902.

In a next step 344, a user input is received by the computing device for viewing a second page of sorted chip images in the plug-in window. The user input is facilitated by a GUI widget (e.g., GUI widget 804 or 806 of FIG. 8A) of the plug-in window (e.g., the plug-in window 702 of FIG. 7). The GUI widget may be configured to facilitate moving through pages of unsorted and/or sorted chip images. In this regard, the GUI widget includes arrow buttons that allow a user to move forward and backward through the pages of unsorted and/or sorted chip images. Alternatively or additionally, the GUI widget may be configured to facilitate jumping to a desired page of unsorted and/or sorted chip images for review. In this regard, the GUI widget includes a text box for entering a page number and a search button for causing the page of unsorted and/or sorted chip images having the entered page number to be displayed in the display area (e.g., display area 706 of FIG. 7) of the plug-in window (e.g., plug-in window 702 of FIG. 7).

Figure 3C:
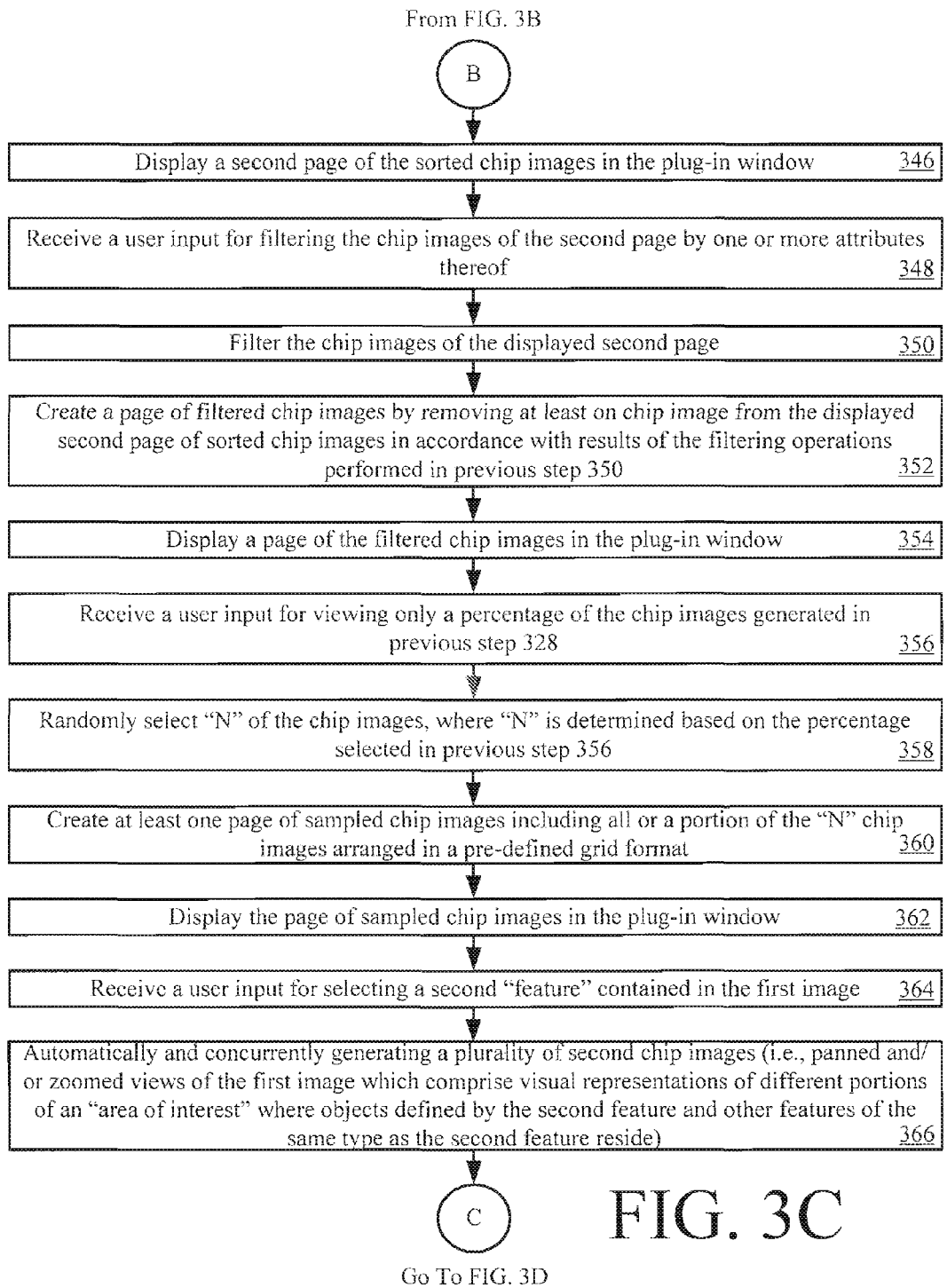

After the user input is received in step 344, the method 300 continues with step 346 of FIG. 3C. As shown in FIG. 3C, step 346 involves displaying the second page of sorted chip images in the plug-in window. A schematic illustration of an exemplary second page of sorted chip images 1202 displayed in the plug-in window 702 is provided in FIG. 11.

In a next step 348, the computing device receives a user input for filtering the chip images of the second page by one or more feature attributes thereof. The user input is facilitated by a GUI widget (e.g., GUI widget 812 of FIG. 8A) of the plug-in window (e.g., the plug-in window 702 of FIG. 7). The GUI widget is configured to facilitate a selection of features for display in the display area (e.g., display area 706 of FIG. 7) of the plug-in window (e.g., plug-in window 702 of FIG. 7) based on their attributes. In this regard, the GUI widget may include, but is not limited to, a "filter control" button and a "filter setting" drop down button. The "filter control" button facilitates the enablement and disablement of an attribute filter function. The "filter setting" drop down button facilitates the display of a drop-down box for assembling a query phrase defining an attribute filter (e.g., ["HEIGHT"='100 Feet'], ["HEIGHT"<'100 Feet'], ["HEIGHT"<>'100 Feet'], ["HEIGHT" IS NULL], ["HEIGHT" IS NOT NULL], ["HEIGHT"≥'100 Feet' AND "DIAMETER">'40 Feet'], or ["HEIGHT"≤'100 Feet' OR "DIAMETER">'40 Feet']). A schematic illustration of an exemplary drop-down box 850 is provided in FIG. 8B.

Figure 13:
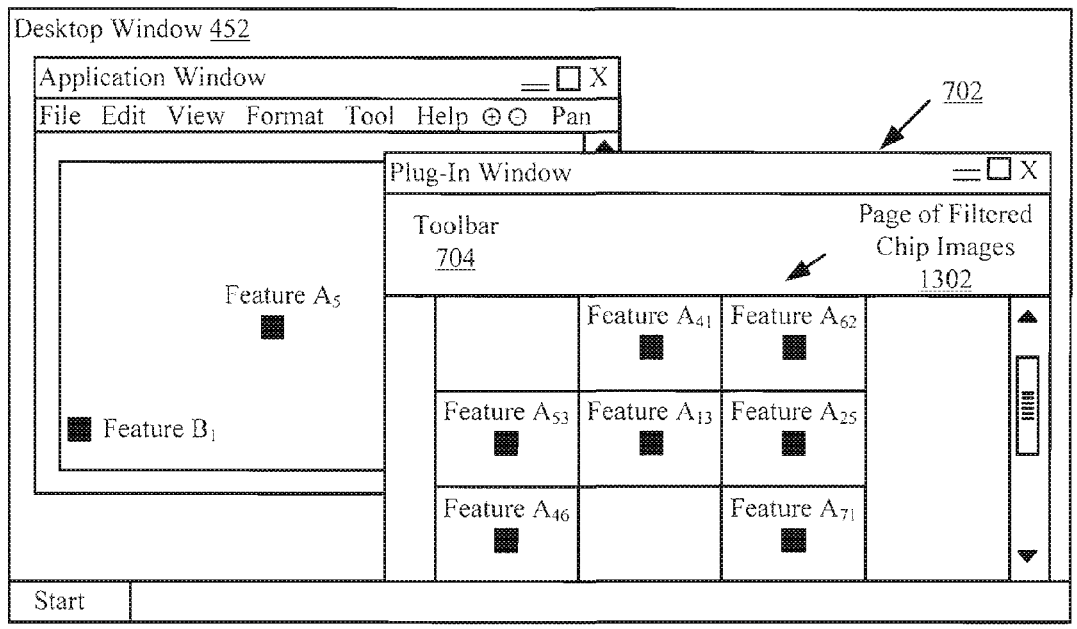
FIG. 13 is a schematic illustration of an exemplary page of filtered chip images that is useful for understanding the present invention.

Upon receipt of the user input in step 348, the feature analysis plug-in performs operations to filter the chip images of the displayed second page of sorted chip images, as shown by step 350. In a next step 352, a page of filtered chip images is created by the feature analysis plug-in. The page of filtered chip images is created by removing at least one chip image from the displayed second page of sorted chip images in accordance with the results of the filtering operations performed in previous step 350. Thereafter, the page of filtered chip images is displayed in the display area (e.g., display area 706 of FIG. 7) of the plug-in window (e.g., plug-in window 702 of FIG. 7). A schematic illustration of an exemplary page of filtered chip images 1302 is provided in FIG. 13. As shown in FIG. 13, the page of filtered chip images 1302 includes the chip images $A_{41}, A_{62}, A_{53}, A_{13}, A_{25}, A_{46}, A_{71}$ contained in the second page of sorted chip images 1202 of FIG. 12. However, the page of filtered chip images 1302 does not include chip images $A_{10}$ and $A_{92}$ in grid cells thereof. In this regard, it should be understood that chip images $A_{10}$ and $A_{92}$ have been removed from the second page of sorted chip images 1202 of FIG. 12 to obtain the page of filtered chip images 1302. Embodiments of the present invention are not limited in this regard.

Referring again to FIG. 3C, the method 300 continues with step 356 where the computer device receives a user input for viewing only a portion (e.g., a percentage) of the chip images generated in previous step 328. The user input is facilitated by a GUI widget (e.g., GUI widget 820 of FIG. 8A) of the plug-in window (e.g., the plug-in window 702 of FIG. 7). The GUI widget is configured to facilitate the display of a random sample of chip images of features of a particular feature class for visual inspection. As such, the GUI widget may include, but is not limited to, a button for enabling/disabling a random sampling function of the feature analysis plug-in and a drop down menu from which a percentage value can be selected.

In response to the reception of the user input in step 356, step 358 is performed where "N" chip images of the first chip images generated in previous step 328 are randomly selected. The value of "N" is determined based on the percentage value selected in previous step 356. For example, if one hundred first chip images were generated in step 328 and the percentage value of twenty was selected in step 356, then twenty chip images would be randomly selected from the one hundred first chip images. Embodiments of the present invention are not limited in this regard.

Upon completing step 358, step 360 is performed where the feature analysis plug-in creates at least one page of sampled chip images including all or a portion of the "N" chip images arranged in a grid or matrix format. Notably, the pages of sampled chip images can have a default grid size or a user-specified grid size. For example, if a grid size is four cells by four cells and "N" equals twenty, then two pages of sampled chip images would be created in step 360 since each page can contain a maximum of sixteen chip images. In contrast, if the grid size is five cells by five cells and "N" equals twenty, then only one page of sampled chip images would be created in step 360 since the page can contain a maximum of twenty-five chip images. Embodiments of the present invention are not limited in this regard.

Figure 14:
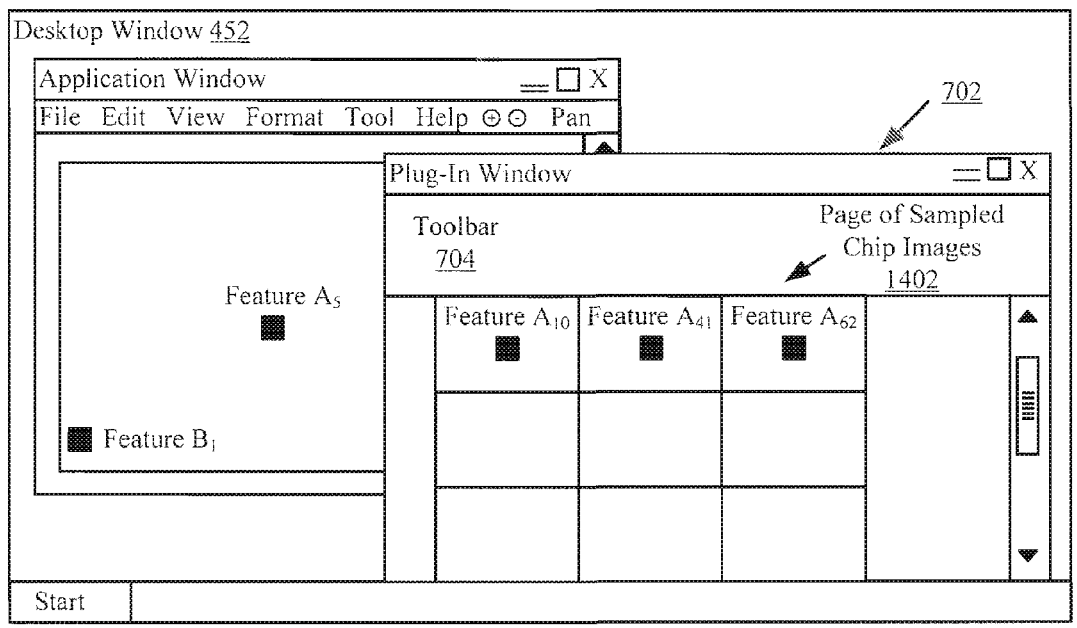
FIG. 14 is a schematic illustration of an exemplary page of sampled chip images that is useful for understanding the present invention.

A schematic illustration of an exemplary page of sampled chip images 1402 is provided in FIG. 14. As shown in FIG. 14, the page of sampled chip images 1402 includes only three chip images. In this regard, the total number of first chip images is nine and the percentage selected in step 356 is thirty-three percent. Accordingly, the value of "N" is three. The three chip images contained in the page 1402 were randomly selected from the nine first chip images. Embodiments of the present invention are not limited to the particularities of this example.

Figure 15:
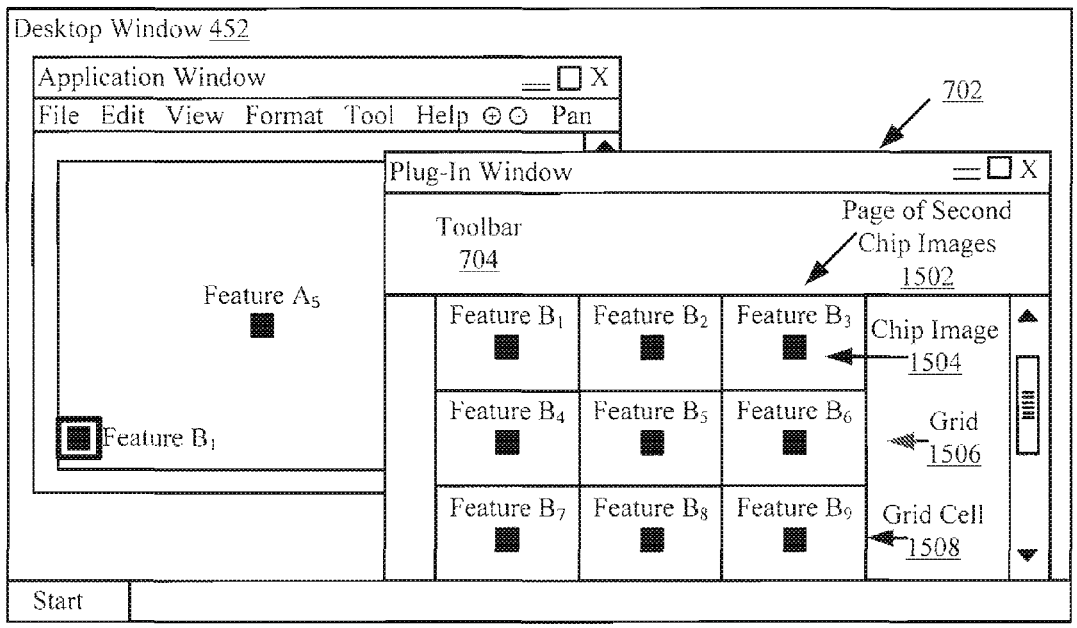
FIG. 15 is a schematic illustration of an exemplary page of second chip images that is useful for understanding the present invention.

Referring again to FIG. 3C, the method 300 continues with step 364 where the computing device receives a user input for selecting a second feature displayed over the first image (e.g., feature $B_1$ of FIG. 15). A feature in the second feature class can be selected by moving a mouse cursor over the feature that is visible in the first chip image and clicking a mouse button. A schematic illustration of an exemplary selected feature $B_1$ in the second feature class displayed over the first image is provided in FIG. 15. As shown in FIG. 15, the selected feature $B_1$ is surrounded by a box. Embodiments of the present invention are not limited in this regard. Any type of mark or annotation can be used to illustrate that a particular feature of an image has been selected.

In response to the reception of the user input in step 364, the feature analysis plug-in performs operations to automatically and concurrently generate a plurality of second chip images, as shown by step 366. The second set of chip images are generated using the feature list generated in previous step 314, the spatial feature data for the features which are of the same type as the second feature selected in previous step 364, and/or the image data for the first image. The second set of chip images are panned or zoomed views of the first image which include visual representations of different portions of the first image defined by the features of the second feature class. The second set of chip images can have a default zoom level of scale or resolution.

Figure 3D:
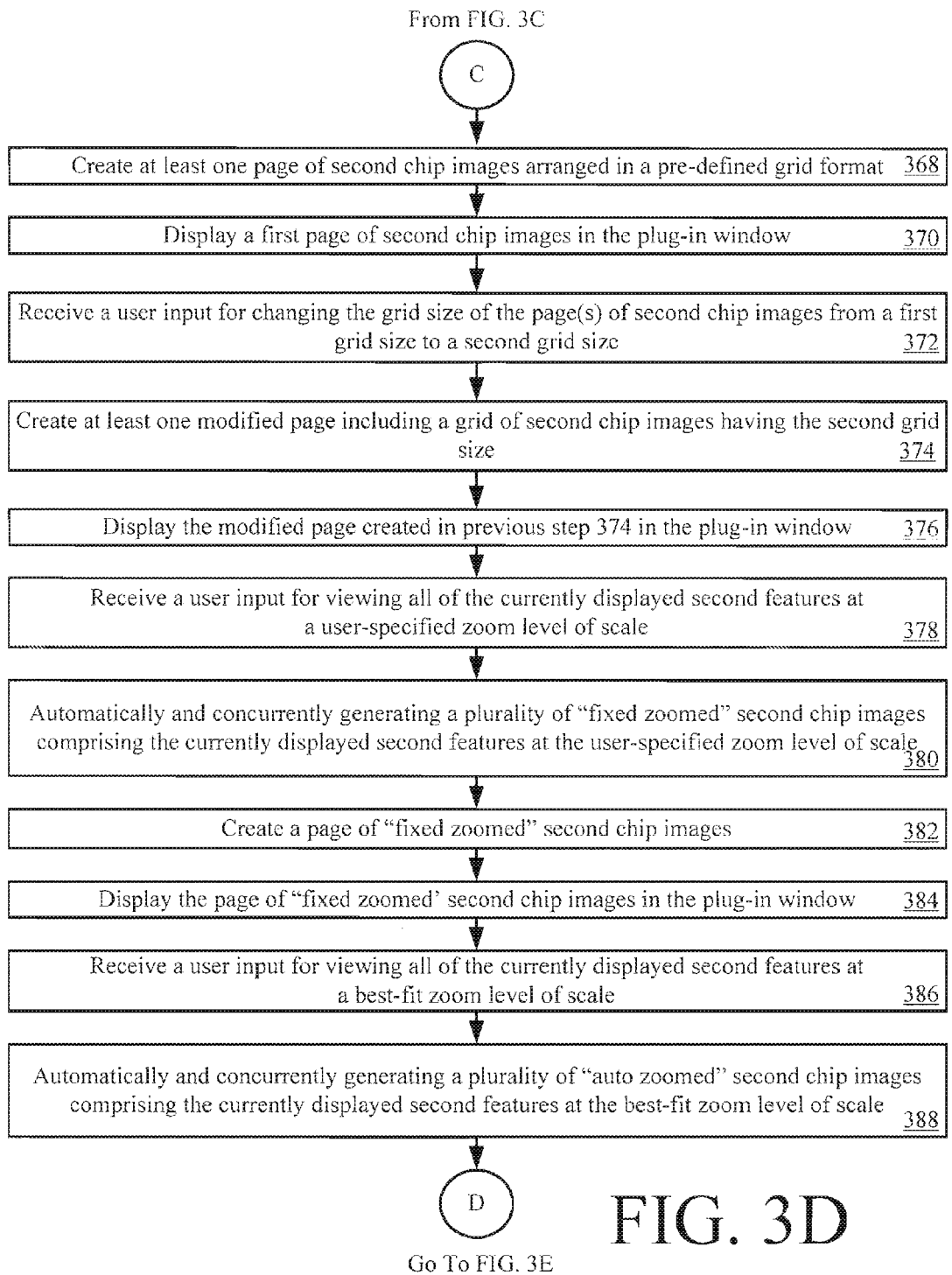

After the second chip images have been generated, the method 300 continues with step 368 of FIG. 3D. As shown in FIG. 3D, step 368 involves creating at least one page of second chip images arranged in a pre-defined grid or matrix format. The grid or matrix of the chip images has a default size or a user-specified size (e.g., three cells by three cells). Notably, the second chip images can be arranged within the grid or matrix in an unsorted order or a sorted order. In a next step 370, a second page of the chip images is displayed in a plug-in window. A schematic illustration of an exemplary second page of chip images 1502 is provided in FIG. 15. As shown in FIG. 15, the page 1502 comprises a grid 1506 defined by a plurality of grid cells 1508. A different chip image 1504 is presented within each grid cell 1508 of the grid 1506. Each of the chip images 1504 comprises a visual representation of a feature in the feature class selected in previous step 364 of FIG. 3C.

Referring again to FIG. 3D, the method 300 continues with step 372 where the computing device receives a user input for changing a grid size of the page(s) of second chip images from a first grid size (e.g., three cells by three cells) to a second grid size (e.g., two cells by two cells). The user input is facilitated by a GUI widget (e.g., GUI widget 808 of FIG. 8A) of the plug-in window (e.g., the plug-in window 702 of FIG. 7). The GUI widget is configured to facilitate a selection of a grid size from a plurality of pre-defined grid sizes. As such, the GUI widget may include, but is not limited to, a drop down list listing a plurality of pre-defined grid sizes.

In response to the reception of the user input in step 372, the feature analysis plug-in performs operations to create at least one modified page including a grid of second chip images having the second grid size (e.g., two cells by two cells), as shown by step 374. Thereafter in step 376, the modified page of second chip images is displayed in the plug-in window.

Figure 16:
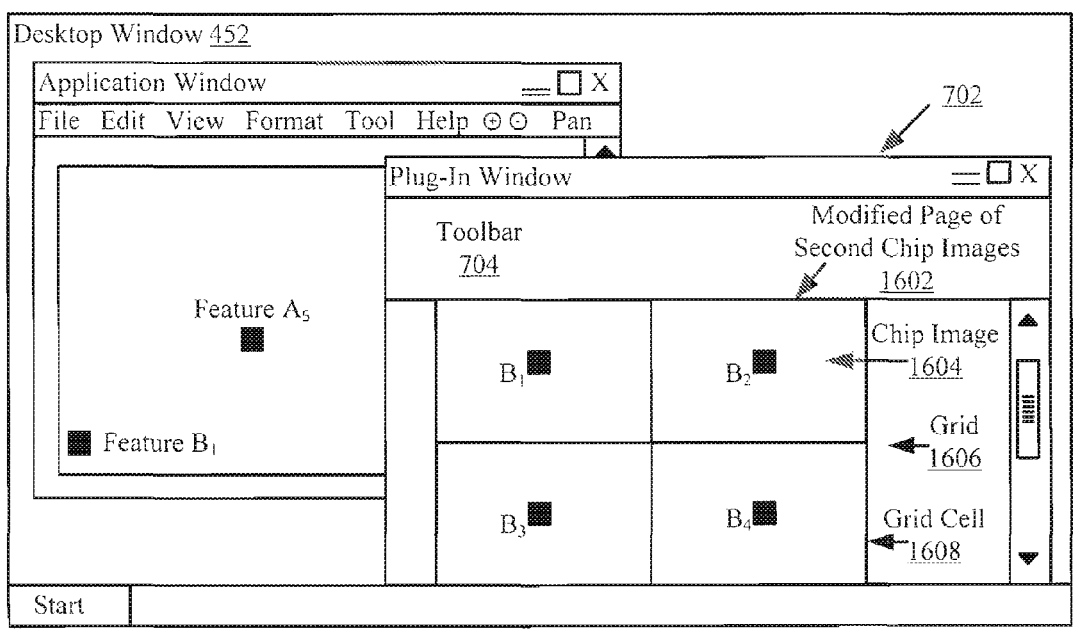
FIG. 16 is a schematic illustration of an exemplary modified page of second chip images that is useful for understanding the present invention.

A schematic illustration of an exemplary modified page of second chip images 1602 is provided in FIG. 16. As shown in FIG. 16, the modified page 1602 comprises a grid 1606 with a grid size of two cells by two cells. Each of the four grid cells 1608 includes a chip image 1604. The chip images 1604 collectively comprises a portion of the chip images 1508 contained in page 1502 of FIG. 15. The absence of certain chip images 1508 from page 1602 is a result of the reduction in grid size from three cells by three cells to two cells by two cells. Notably, the display area for each chip image 1604 is larger than the display area for each chip image 1508. This increase of display area for the chip images 1604 is also a result of the reduction in grid size from three cells by three cells to two cells by two cells. It should also be noted that larger portions of the first image surrounding features $B_1$, $B_2$, $B_3$, $B_4$ are displayed in the grid cells 1608 as compared to that displayed in corresponding grid cells 1508 of FIG. 15. This increase in surrounding portions of the first image is at least partially due to the reduction in grid size as well as the fact that the chip images of grid cells 1608 have the same zoom level of scale or resolution. It should further be noted that the selected feature $B_1$ is located in the upper, left corner grid cell 1608 of the page 1602. Embodiments of the present invention are not limited in the particularities of FIG. 16.

Referring again to FIG. 3D, the method 300 continues with step 378. In step 378, the computing device receives a user input for viewing all of the currently displayed second features (e.g., features $B_1$, $B_2$, $B_3$ and $B_4$ of FIG. 16) at a user-specified zoom level of scale. The user input is facilitated by a GUI widget (e.g., GUI widget 826 of FIG. 8A) of the plug-in window (e.g., plug-in window 702 of FIG. 4). The GUI widget is configured to facilitate the performance of manual-scale operations by the feature analysis plug-in. The manual-scale operations are operative to adjust the zoom level of scale of all of the displayed chip images (e.g., chip images 1604 of FIG. 16) from a first zoom level of scale to a second zoom level of scale in response to a user-software interaction. The first zoom level of scale is a default zoom level of scale (e.g., 100%) or a previously user-selected zoom level of scale (e.g., 50%). The second zoom level of scale is a new user-selected zoom level of scale (e.g., 75%). As such, the GUI widget may include, but is not limited to, a drop down list populated with a plurality of whole number percentage values.

After the reception of the user input in step 378, the feature analysis plug-in performs operations for automatically and concurrently generating a plurality of "fixed zoomed" second chip images comprising the currently displayed second features at the user-specified zoom level of scale, as shown by step 380. In a next step 382, the feature analysis plug-in performs operations to create a page of "fixed zoomed" second chip images. Thereafter in step 384, the page of "fixed zoomed" second chip images is displayed in the plug-in window.

Figure 17:
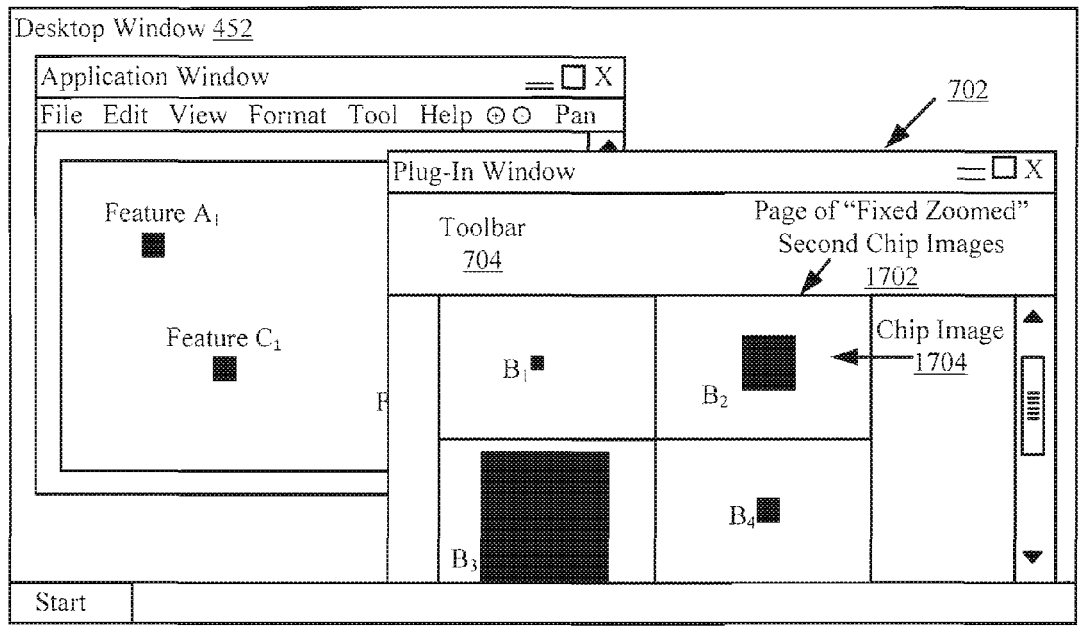
FIG. 17 is a schematic illustration of an exemplary page of "fixed zoomed" second chip images that is useful for understanding the present invention.

A schematic illustration of an exemplary page of "fixed zoomed" second chip images 1702 is provided in FIG. 17. As shown in FIG. 17, all of the chip images 1704 have the same zoom level of scale. As such, the smallest feature $B_1$ appears smaller than the larger features $B_2$, $B_3$, $B_4$. Similarly, the largest feature $B_3$ appears larger than the smaller features $B_1$, $B_2$, $B_4$. Embodiments of the present invention are not limited to the particularities of FIG. 17.

Referring again to FIG. 3D, the method 300 continues with step 386. In step 386, the computing device receives a user input for viewing all of the currently displayed second features (e.g., $B_1$, $B_2$, $B_3$, $B_4$ of FIG. 17) at a best-fit zoom level of scale. The user input is facilitated by a GUI widget (e.g., GUI widget 828 of FIG. 8A) of the plug-in window (e.g., plug-in window 702 of FIG. 7). The GUI widget is configured to facilitate the viewing of each displayed feature at its best-fit zoom level of scale or its pre-defined maximum zoom level of scale. As such, the GUI widget may include, but is not limited to, a button for at least enabling auto-scale operations of the feature analysis plug-in and disabling the manual-scale operations of the feature analysis plug-in.

In response to the reception of the user input in step 386, the feature analysis plug-in performs operations to automatically and concurrently generate a plurality of "auto zoomed" second chip images comprising the currently displayed second features at the best-fit zoom level of scale, as shown by step 388 of FIG. 3D. In a next step 390 of FIG. 3E, the feature analysis plug-in performs operations to create a page of "auto zoomed" second chip images. Thereafter in step 392, the page of "auto zoomed" second chip images is displayed in the plug-in window.

Figure 18:
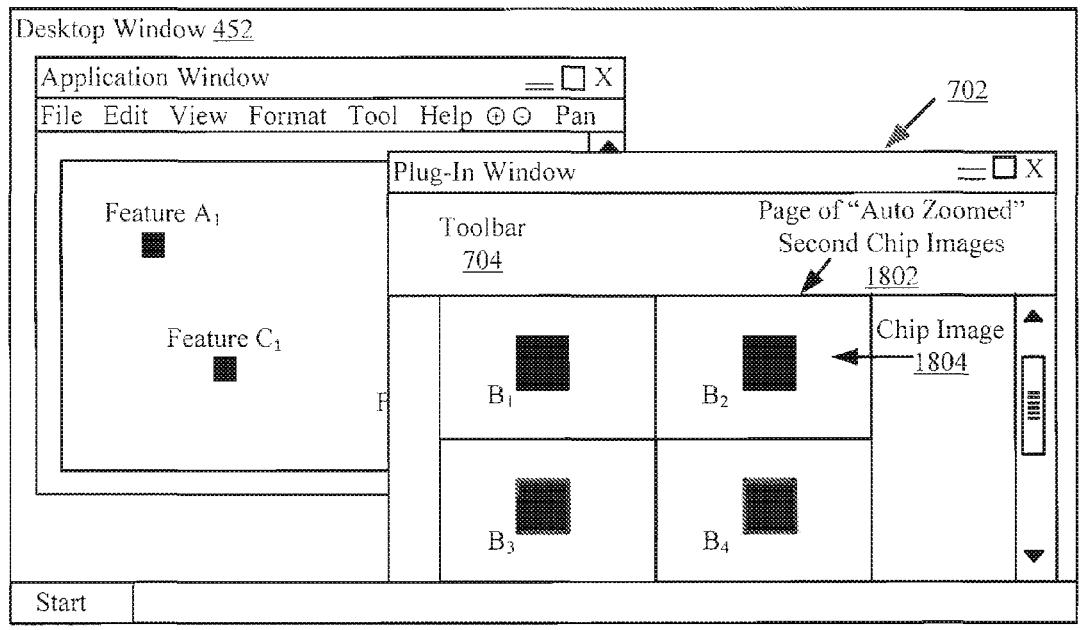
FIG. 18 is a schematic illustration of an exemplary page of "auto zoomed" second chip images that is useful for understanding the present invention.

A schematic illustration of an exemplary page of "auto zoomed" second chip images 1802 is provided in FIG. 18. As shown in FIG. 18, each of the chip images 1804 has a different zoom level of scale. As such, all of the features $B_1$, $B_2$, $B_3$, $B_4$ appear to be of the same size regardless of their actual relative physical sizes. Embodiments of the present invention are not limited to the particularities of FIG. 18.

Referring again to FIG. 3E, the method 300 continues with step 394. In step 394, the computing device receives a user input for selecting one of the "auto zoomed" chip images and enabling "pan to feature" operations of the feature analysis plug-in. The "auto zoomed" chip image can be selected by moving a mouse cursor over the chip image and clicking a mouse button. In response to the click of the mouse button, a menu is presented to the user of the computing device. The menu includes a list of commands, such as a command for enabling "pan to feature" operations.

Figure 19:
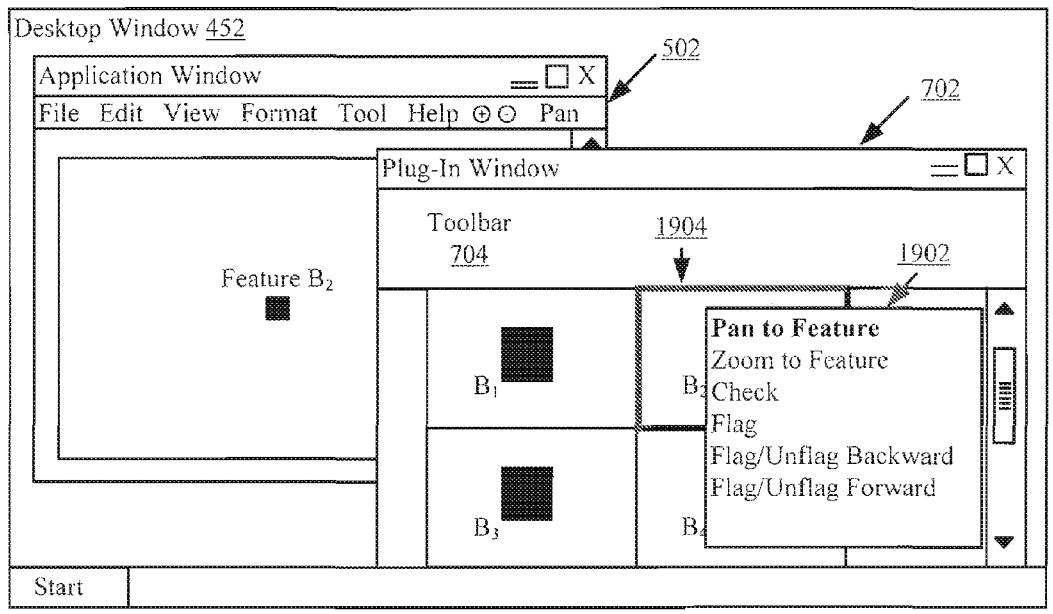
FIG. 19 is a schematic illustration of an exemplary selected chip image and menu of commands that is useful for understanding the present invention.

A schematic illustration of an exemplary selected chip image 1904 and an exemplary menu 1902 is provided in FIG. 19. As shown in FIG. 19, the selected chip image 1904 is annotated with a relatively thick and distinctly colored border. Also, the selected command "Pan to Feature" of the menu 1902 is annotated by bolding the text thereof. Embodiments of the present invention are not limited in this regard. Any type of mark or annotation can be used to illustrate that a particular chip image has been selected and/or that a particular command of a menu has been selected.

Figure 3E:
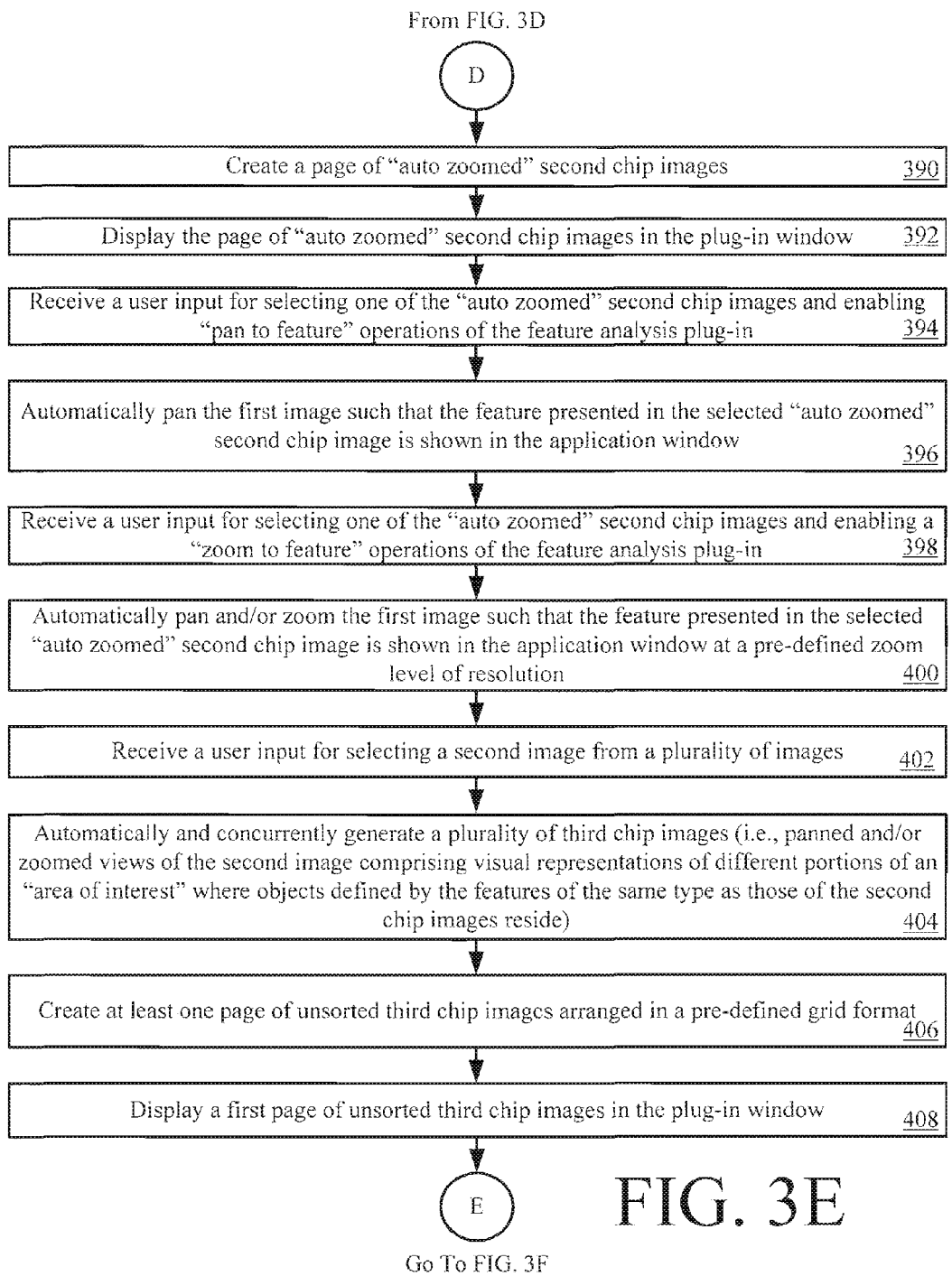

In response to the reception of the user input in step 394 of FIG. 3E, the feature analysis plug-in performs step 396. In step 396, the feature analysis plug-in automatically pans the first image (e.g., image 508 of FIG. 5) such that the feature presented in the selected "auto zoomed" chip image (e.g., feature $B_2$ of FIG. 19) is shown in the application window (e.g., application window 504 of FIG. 19).

In a next step 398, the computing device receives a user input for selecting one of the "auto zoomed" chip images and for enabling "zoom to feature" operations of the feature analysis plug-in. The "auto zoomed" chip image can be selected by moving a mouse cursor over the chip image and clicking a mouse button. In response to the click of the mouse button, a menu is presented to the user of the computing device. The menu includes a list of commands, such as a command for enabling "zoom to feature" operations.

Figure 20:
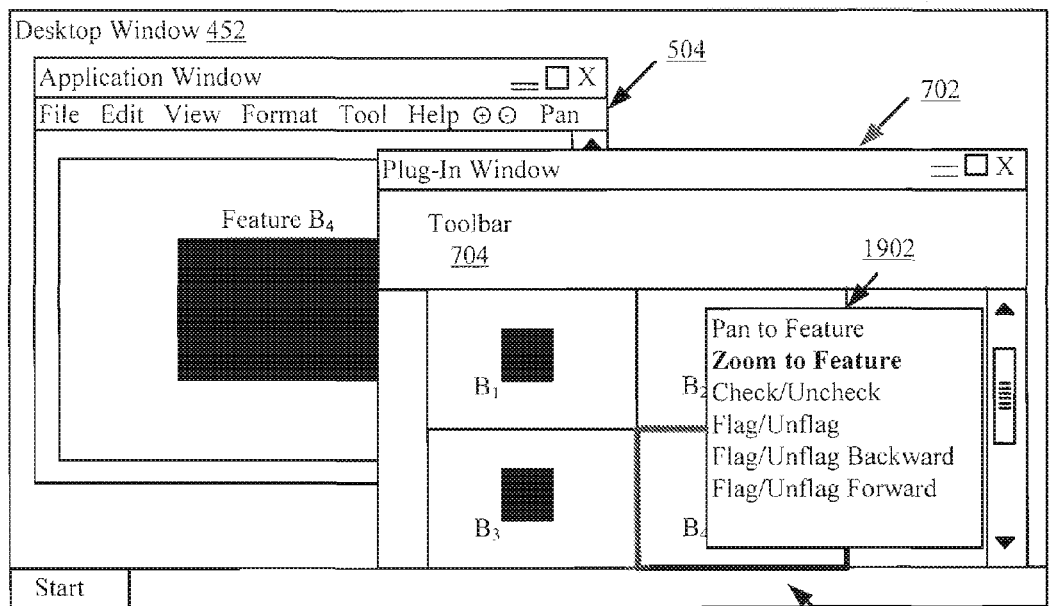
FIG. 20 is a schematic illustration of an exemplary selected chip image and menu of commands that is useful for understanding the present invention.
Figure 21:
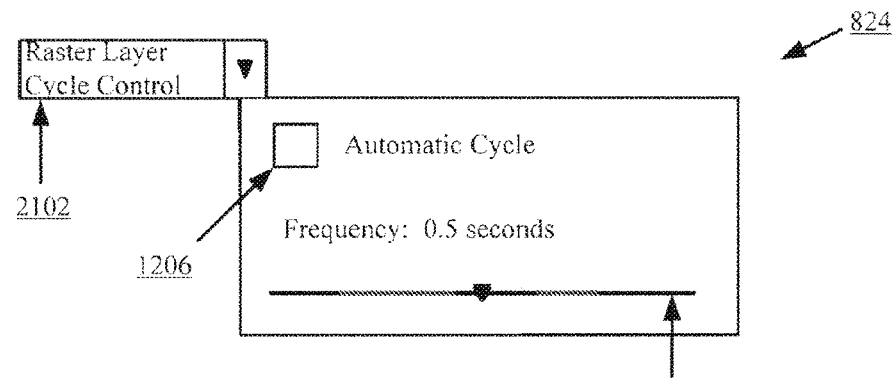
FIG. 21 is a schematic illustration of an exemplary GUI widget of a plug-in window that is useful for understanding the present invention.

A schematic illustration of an exemplary selected chip image 2004 and an exemplary menu 1902 is provided in FIG. 20. As shown in FIG. 20, the selected chip image 2004 is annotated with a relatively thick and distinctly colored border. Also, the selected command "Zoom to Feature" of the menu 1902 is annotated by bolding the text thereof. Embodiments of the present invention are not limited in this regard. Any type of mark or annotation can be used to illustrate that a particular chip image has been selected and/or that a particular command of a menu has been selected.

In response to the reception of the user input in step 398 of FIG. 3E, the feature analysis plug-in performs step 400. In step 400, where the feature analysis plug-in automatically pans and/or zooms the first image (e.g., image 508 of FIG. 5) such that the feature presented in the selected "auto zoomed" chip image (e.g., feature $B_4$ of FIG. 20) is shown in the application window (e.g., application window 504 of FIG. 20) at a pre-defined zoom level of resolution. The pre-defined zoom level of resolution can be a default zoom level of resolution or a user-specified zoom level of resolution. Also, the pre-defined zoom level of resolution can be the same or different zoom level of resolution as the selected chip image.

In a next step 402, the computing device receives a user input for selecting a second image from a plurality of images. The user input is facilitated by a GUI widget (e.g., GUI widget 810 of FIG. 8A) of the plug-in window (e.g., plug-in window 702 of FIG. 7). The GUI widget is configured to facilitate the selection of an image from a list of images. As such, the GUI widget may include, but is not limited to, a text box and a drop down list populated with the names of images.

In response to the reception of the user input in step 402, the feature analysis plug-in performs step 404. In step 404, the feature analysis plug-in automatically and concurrently generates a plurality of third chip images. Third chip images are panned and/or zoomed views of the second image comprising visual representation of different portions of an "area of interest" where objects defined by features of the same type as those of the second chip images reside. Thereafter, the feature analysis plug-in performs operations to create at least one page of unsorted third chip images arranged in a pre-defined grid or matrix format, as shown by step 406. The feature analysis plug-in also performs operations to display the page of unsorted third chip images in the plug-in window, as shown by step 408.

Figure 3F:
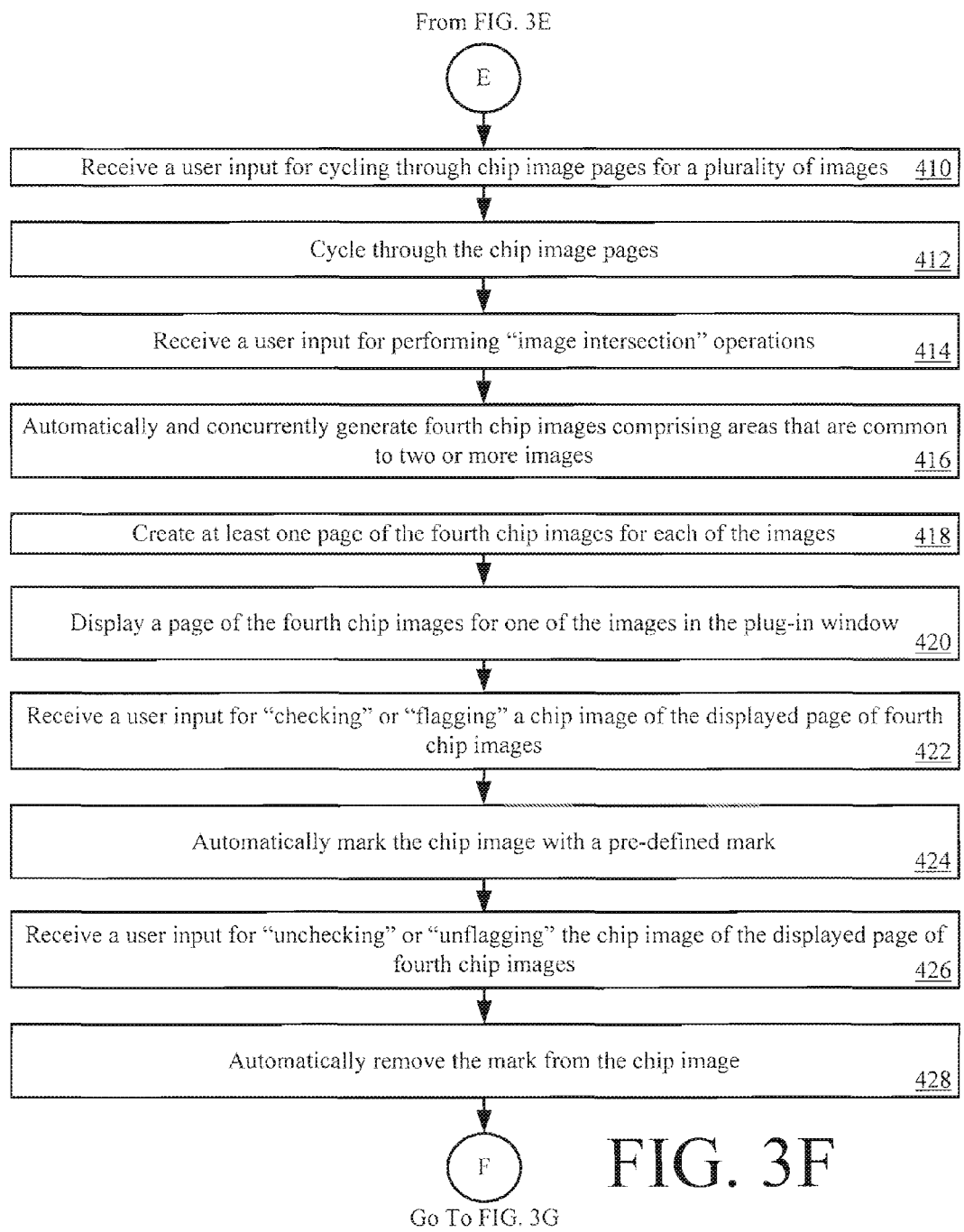

Upon completing step 408 of FIG. 3E, the method 300 continues with step 410 of FIG. 3F. In step 410, the computing device receives a user input for cycling through chip image pages for a plurality of images. The user input is facilitated by a GUI widget (e.g., GUI widget 824 of FIG. 8A) of the plug-in window. The GUI widget is configured to allow manual cycling and/or automatic cycling between chip image pages for a plurality of images. As such, the GUI widget may include, but is not limited to, a check box for enabling and disabling automatic image cycling operations of the feature analysis plug-in (e.g., check box 2106 of FIG. 21), a slider for setting the rate at which the images automatically cycle (e.g., slider 2104 of FIG. 21), and/or a button for manually commanding when to change the image (e.g., button 2102 of FIG. 21).

Figure 22:
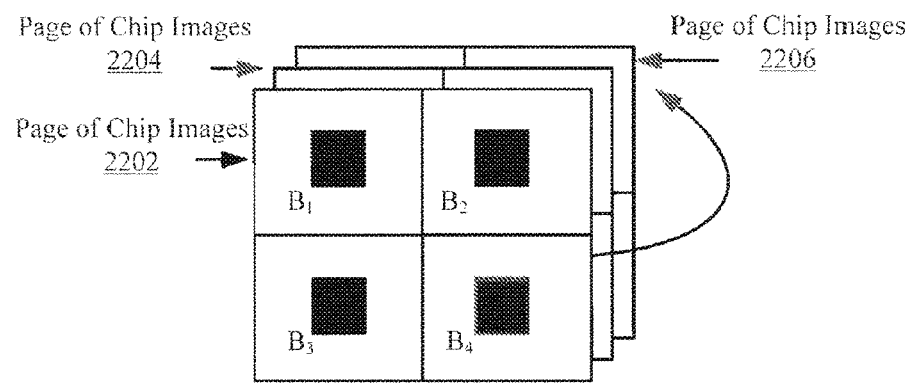
FIG. 22 is a schematic illustration of an exemplary image cycling process that is useful for understanding the present invention.

In response to the reception of the user input in step 410, the feature analysis plug-in performs operations for cycling through the pages of one or more images, as shown by step 412. A schematic illustration of an exemplary image cycling process performed in step 412 is provided in FIG. 22. As shown in FIG. 22, a first iteration of the image cycling process begins with the display of a first page of chip images 2202 generated using a first image. Upon the expiration of a pre-defined amount of time or in response to a first user input, a second page of chip images 2204 is displayed in the plug-in window. The second page of chip images was generated using a second image different from the first image. The first iteration of the image cycling process ends with the display of a third page of chip images 2206 in response to a second user input or upon the expiration of the pre-defined amount of time. The third page of chip images 2206 was generated using a third image that is different than the first image and/or the second image. Thereafter, a second iteration of the image cycling process can begin such that the pages of chip images 2202, 2204, 2206 are cycled through again. Embodiments of the present invention are not limited to the particularities of FIG. 22.

Referring again to FIG. 3F, the method 300 continues with step 414. In step 414, the computing device receives a user input for performing "image intersection" operations. The user input is facilitated by a GUI widget (e.g., GUI widget 822 of FIG. 8A) of the plug-in window. The GUI widget is configured to facilitate the filtering of features to include those that lie within an area (e.g., a geographical area) that a plurality of images have in common or the union of a plurality of images. As such, the GUI widget may include, but is not limited to, a button for enabling and disabling an image intersection function of the feature analysis plug-in.

In response to the reception of the user input in step 414, the feature analysis plug-in automatically and concurrently generates fourth chip images comprising areas that are common to two or more images, as shown by step 416. In a next step 418, the feature analysis plug-in performs operations to create at least one page of fourth chip images for each of the images (e.g., the first image and the second image). Thereafter, one of the pages of fourth images is displayed in the plug-in window, as shown by step 420.

Figure 23:
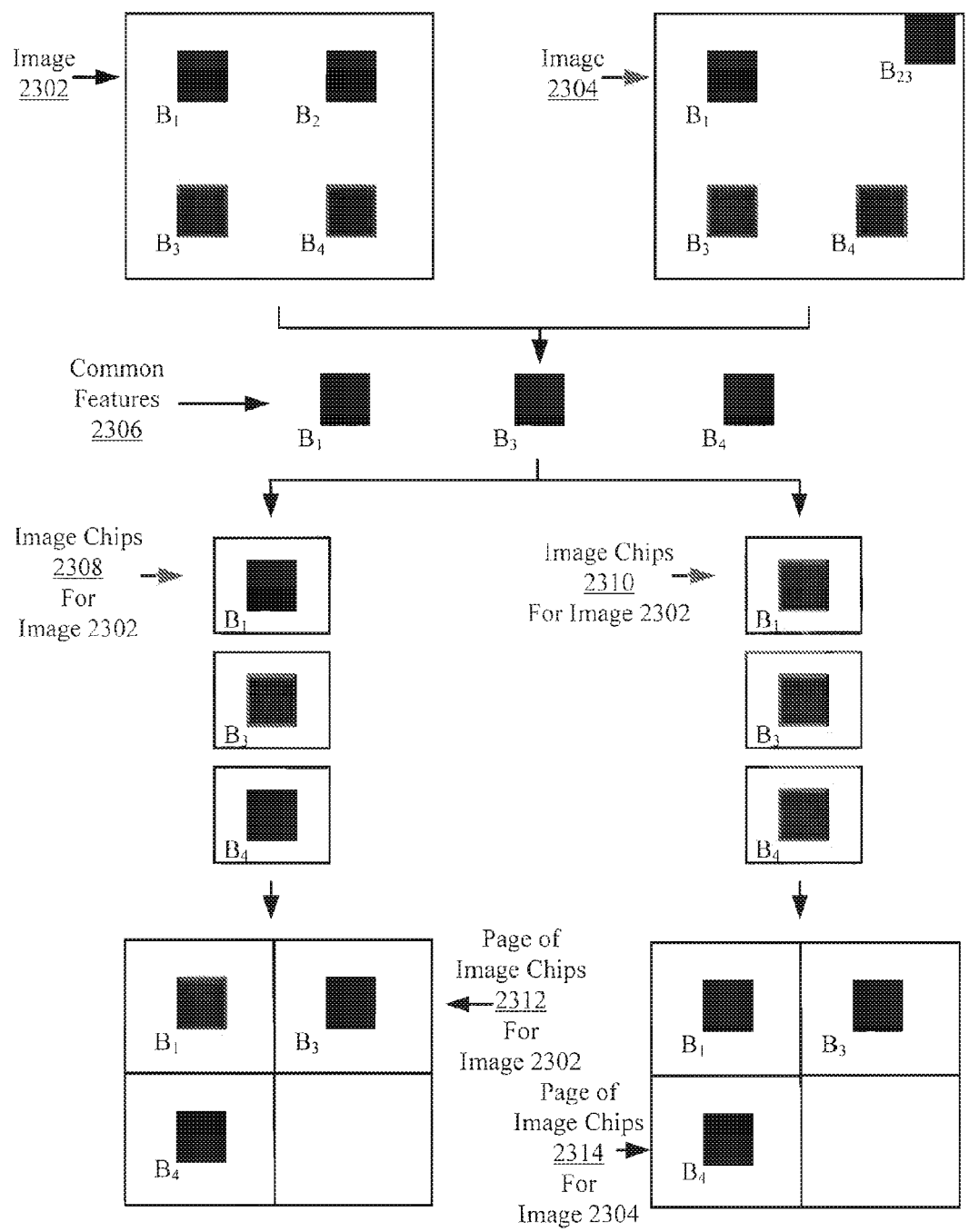
FIG. 23 is a schematic illustration of an exemplary image intersection process that is useful for understanding the present invention.

A schematic illustration of an exemplary image intersection process performed in steps 416 and 418 of FIG. 3F is provided in FIG. 23. As shown in FIG. 23, the image intersection process begins by analyzing at least two images 2303, 2304 to identify which features they have in common (e.g., features $B_1$, $B_3$ and $B_4$). Once the common features 2306 are identified, chip images 2308, 2310 comprising the common features 2306 are generated for each image 2302, 2304. Next, a page of chip images 2312 for the first image 2302 is created. Similarly, a page of chip images 2314 for the second page 2304 is created. Each of the pages 2312 and 2314 includes chip images comprising the common features 2306. Embodiments of the present invention are not limited to the particularities of FIG. 23.

Referring again to FIG. 3F, the method 300 continues with step 422. In step 422, the computing device receives a user input for "checking" or "flagging" a chip image of the displayed fourth chip images. Step 422 can involve selecting a chip image. The chip image can be selected by moving a mouse cursor over the chip image and clicking a mouse button. In response to the click of the mouse button, a menu is presented to the user of the computing device. The menu includes a list of commands, such as a command for enabling "check/uncheck" operations of the feature analysis plug-in.

Figure 24:
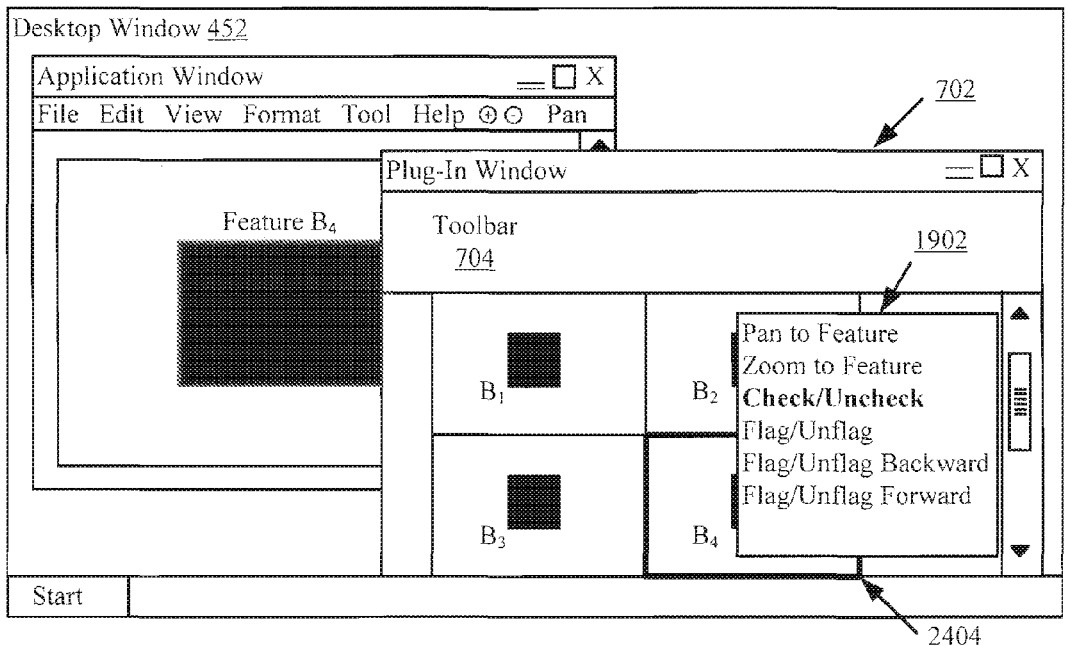
FIG. 24 is a schematic illustration of an exemplary selected chip image and menu of commands that is useful for understanding the present invention.
Figure 25:
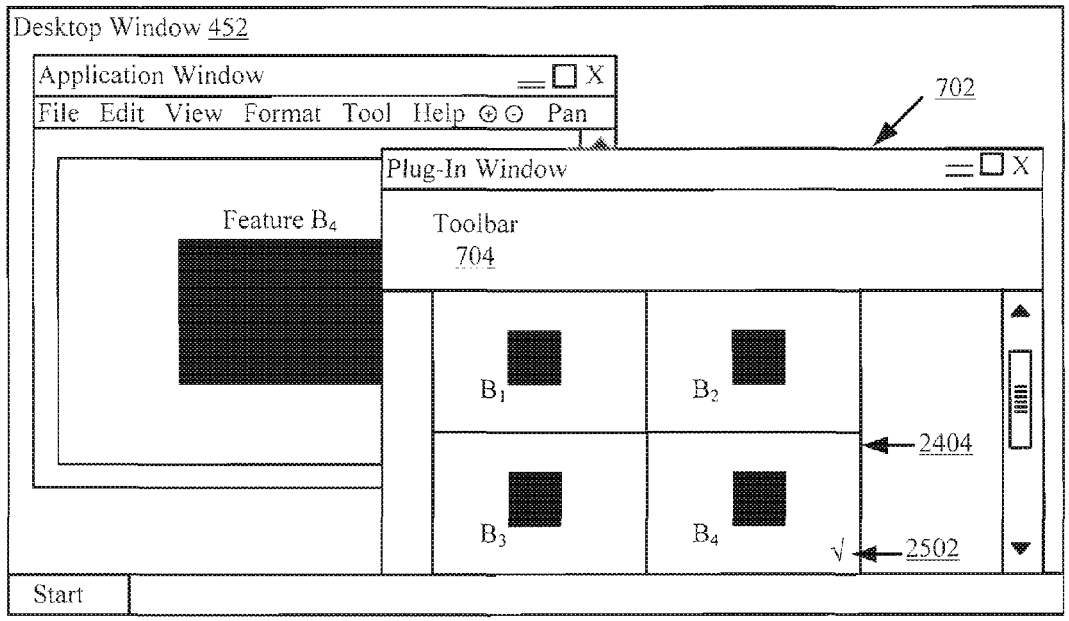
FIG. 25 is a schematic illustration of an exemplary "checked" chip image that is useful for understanding the present invention.
Figure 26:
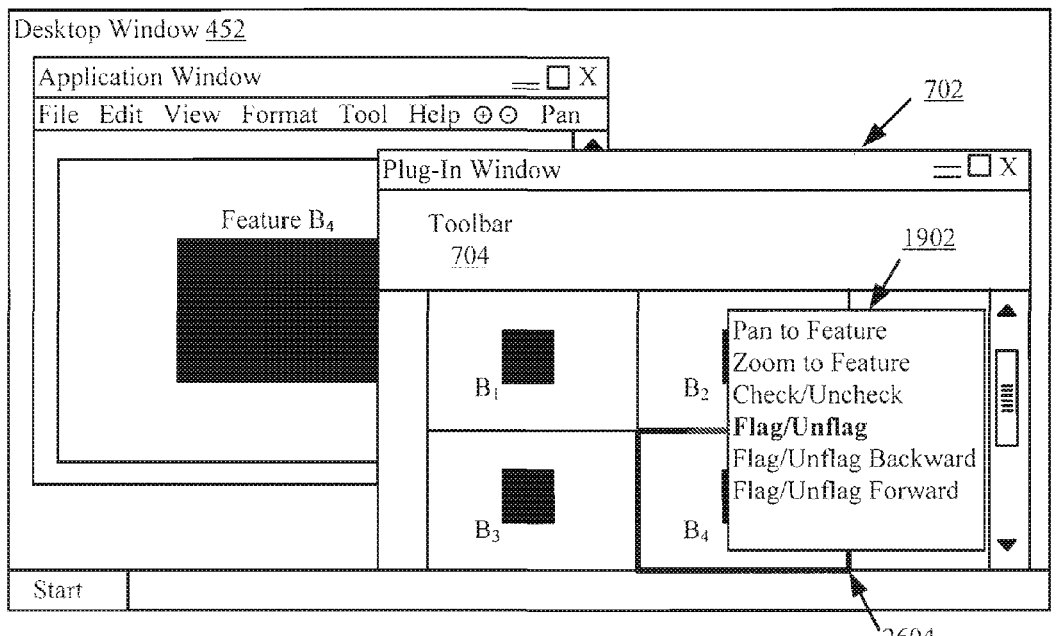
FIG. 26 is a schematic illustration of an exemplary selected chip image and menu of commands that is useful for understanding the present invention.
Figure 27:
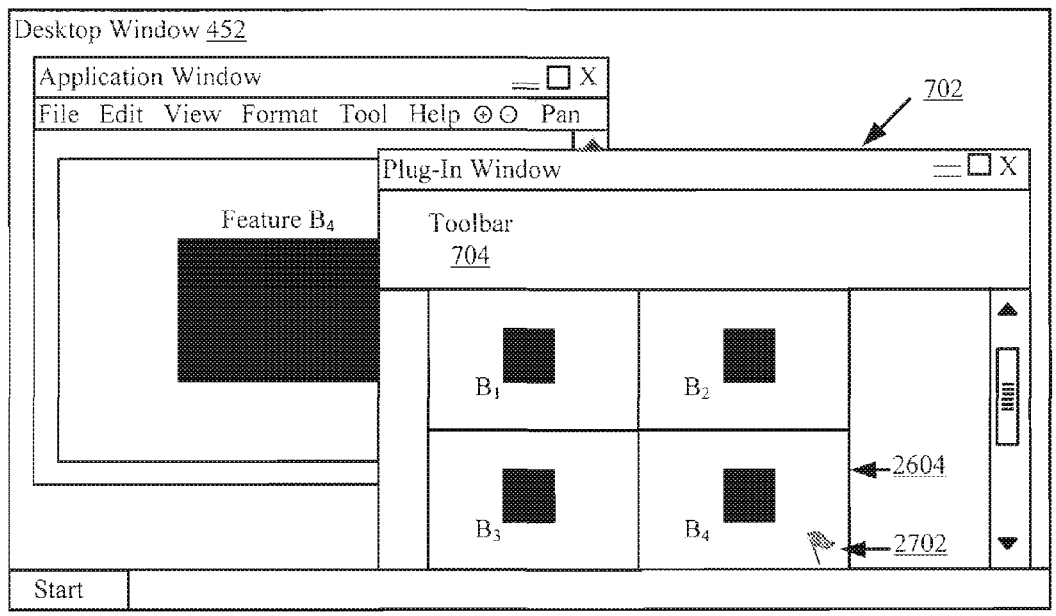
FIG. 27 is a schematic illustration of an exemplary "flagged" chip image that is useful for understanding the present invention.

Schematic illustrations of exemplary selected chip images 2404, 2604 and exemplary menus 1902 are provided in FIGS. 24 and 26. As shown in FIGS. 24 and 26, the selected chip image 2404, 2604 is annotated with a relatively thick and distinctly colored border. Also, a selected command "Check/Uncheck" or "Flag/Unflag" of the menu 1902 is annotated by bolding the text thereof. Embodiments of the present invention are not limited in this regard. Any type of mark or annotation can be used to illustrate that a particular chip image has been selected and/or that a particular command of a menu has been selected.

In response to the reception of the user input in step 394 of FIG. 3E, the feature analysis plug-in performs step 396. In step 396, the selected chip image is automatically marked with a pre-defined mark. A schematic illustration of a chip image 2404 marked with a check 2502 is provided in FIG. 25. A schematic illustration of a chip image 2604 marked with a flag 2702 is provided in FIG. 27. Embodiments of the present invention are not limited to the particularities of FIGS. 25 and 27. Any type of mark or annotation can be employed to illustrate that a chip image has been checked or flagged.

Referring again to FIG. 3F, the method 300 continues with step 426 where the computing device receives a user input for "unchecking" or "unflagging" the marked chip image (e.g., chip image 2404 of FIG. 25 or chip image 2604 of FIG. 27) of the displayed page of fourth chip images. In response to the user input of step 426, the mark (e.g., mark 2502 of FIG. 25 or mark 2702 of FIG. 27) is automatically removed from the marked chip image (e.g., chip image 2404 of FIG. 25 or chip image 2604 of FIG. 27), as shown by step 428.

Figure 3G:
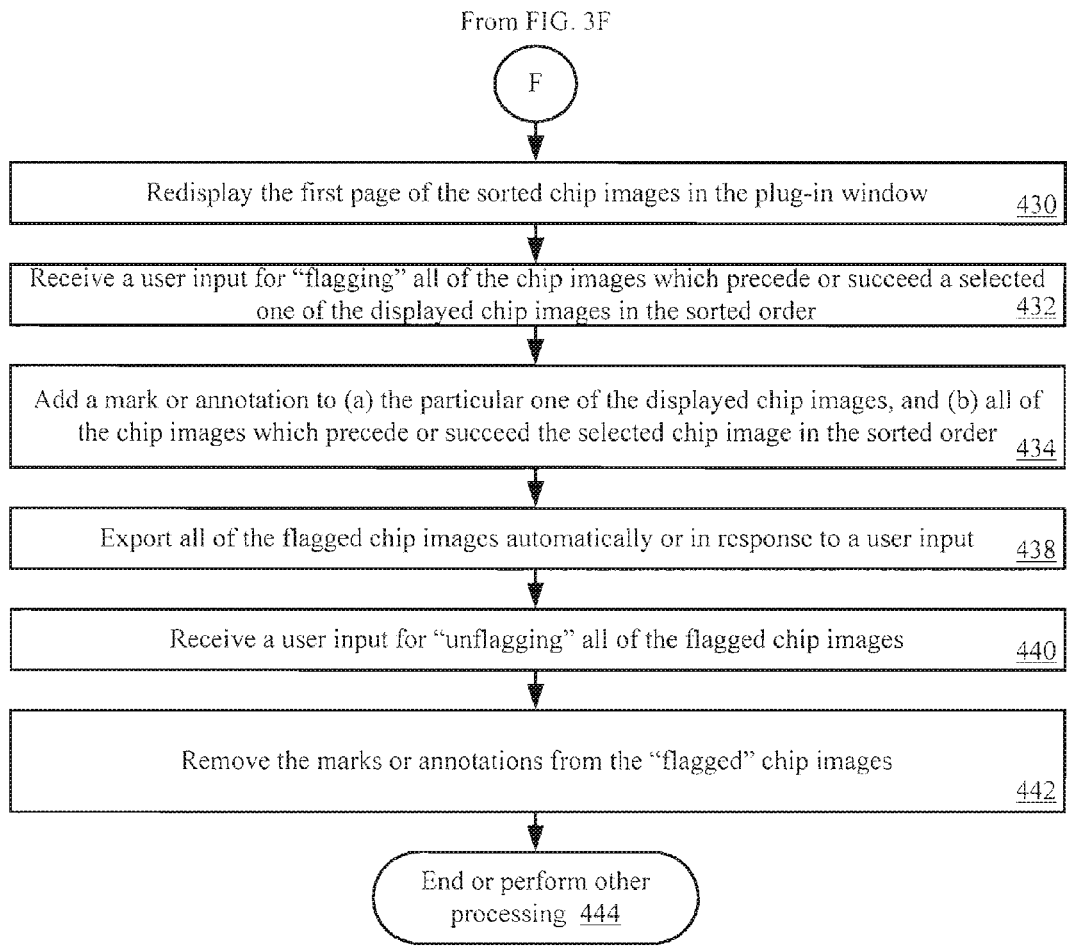

Upon completing step 428 of FIG. 3F, the method 300 continues with step 430 of FIG. 3G. As shown in FIG. 3G, step 430 involves redisplaying the first page of the sorted chip images in the plug-in window. In a next step 432, the computing device receives a user input for "flagging" all of the chip images which precede or succeed a selected one of the displayed chip images in the sorted order. The chip image is selected by moving a mouse cursor over the chip image and clicking a mouse button. In response to the click of the mouse button, a menu is presented to the user of the computing device. The menu includes a list of commands, such as a command for enabling "Flag/Unflag Backward" or "Flag/Unflag Forward" operations.

Figure 28:
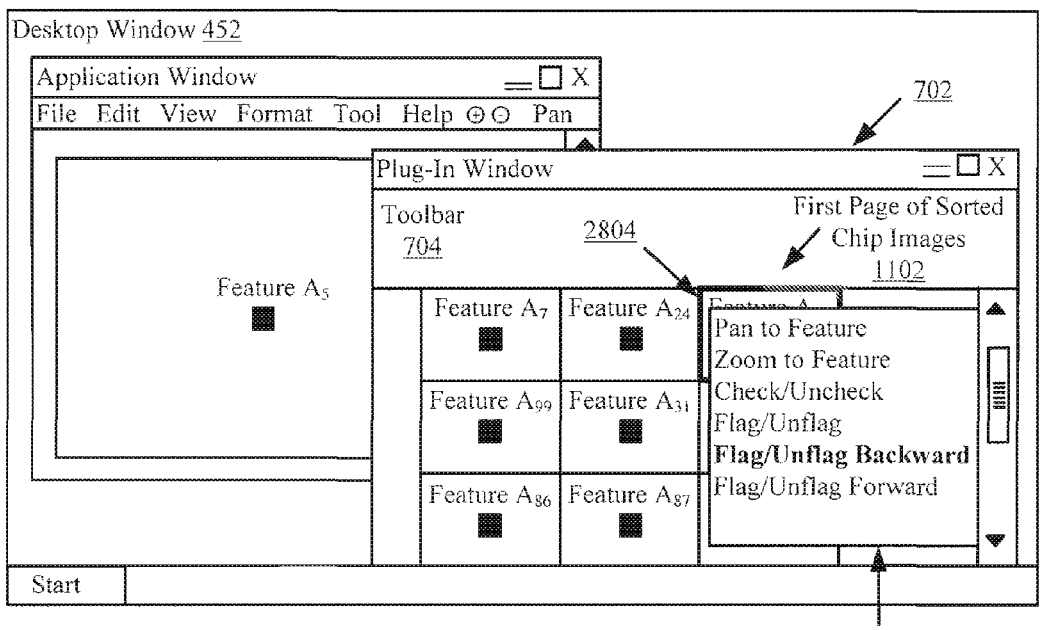
FIG. 28 is a schematic illustration of an exemplary selected chip image and menu of commands that is useful for understanding the present invention.
Figure 29:
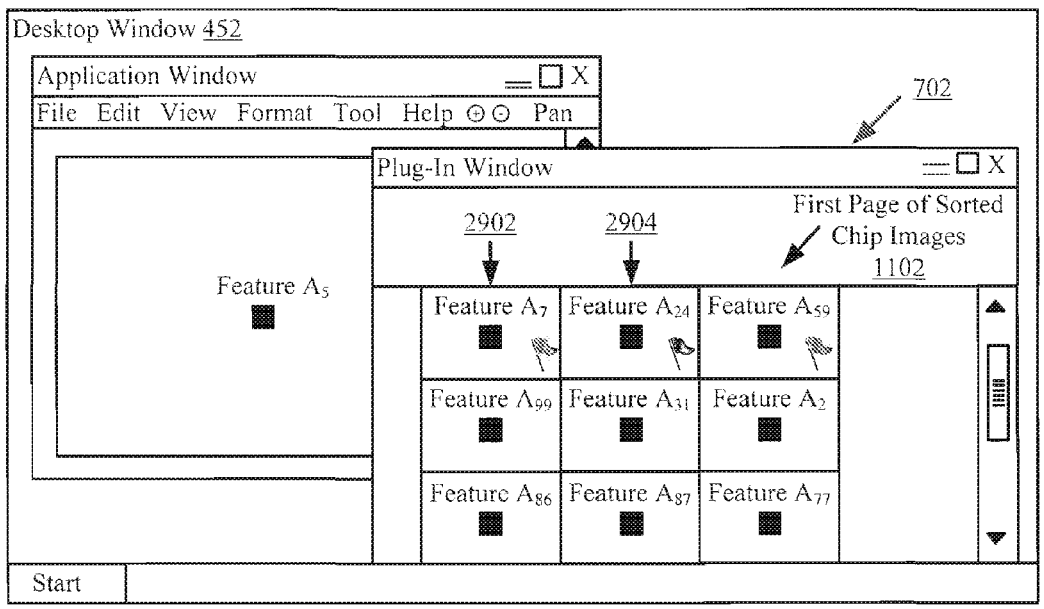
FIG. 29 is a schematic illustration of a plurality of "flagged backward" chip images that is useful for understanding the present invention.
Figure 30:
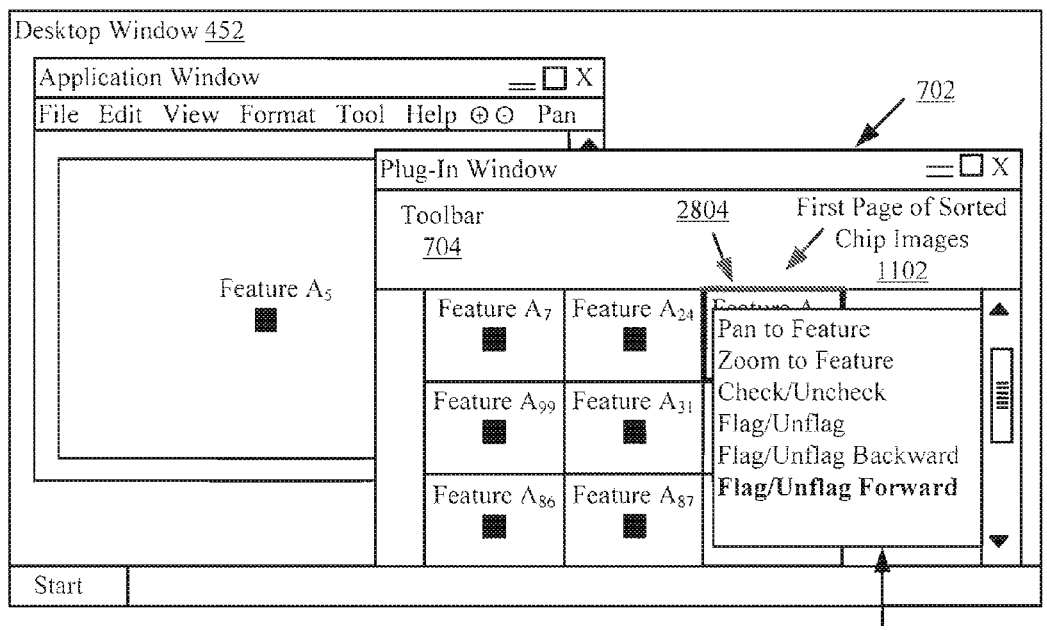
FIG. 30 is a schematic illustration of an exemplary selected chip image and menu of commands that is useful for understanding the present invention.
Figure 31:
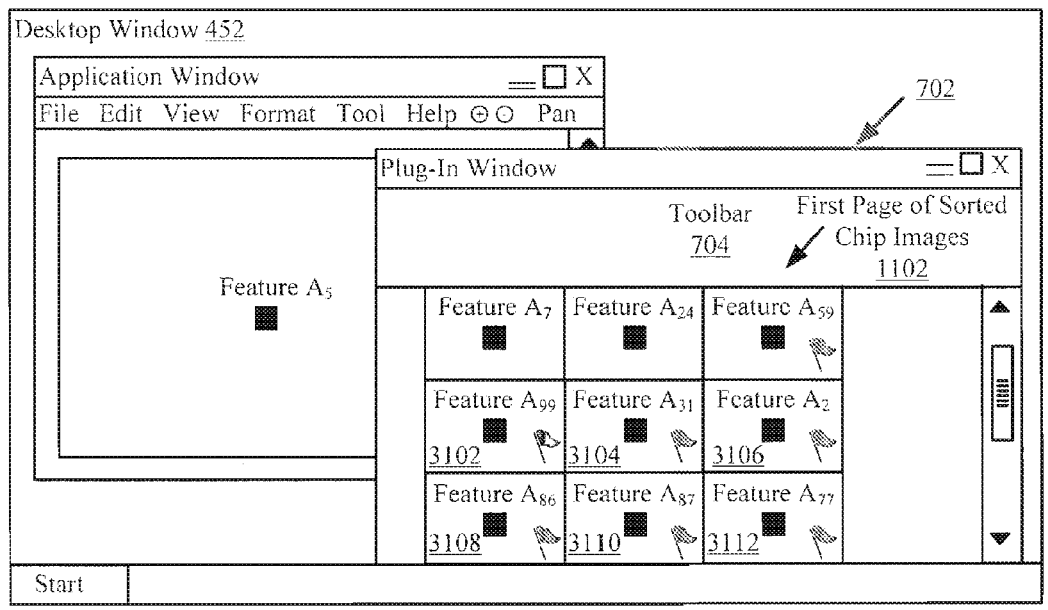
FIG. 31 is a schematic illustration of an exemplary "flagged forward" chip images that is useful for understanding the present invention.

Schematic illustrations of exemplary selected chip images 2804 and exemplary menus 1902 are provided in FIGS. 28 and 30. As shown in FIGS. 28 and 30, the selected chip image 2804 is annotated with a relatively thick and distinctly colored border. Also, the selected command "Flag/Unflag Backward" or "Flag/Unflag Forward" of the menu 1902 is annotated by bolding the text thereof. Embodiments of the present invention are not limited in this regard. Any type of mark or annotation can be used to illustrate that a particular chip image has been selected and/or that a particular command of a menu has been selected.

Referring again to FIG. 3G, the method 300 continues with step 434. In step 434, the feature analysis plug-in performs operations to add a mark or annotation to the selected chip image (e.g., chip image 2304 of FIGS. 28 and 30) and to all of the chip images which precede or succeed the selected chip image in a sorted order (e.g., chip images 2902, 2904 of FIG. 29 and chip images 3102-3112 of FIG. 31). Upon completing step 434, step 438 is performed where all of the "flagged" chip images are exported to a table or file. The exportation can be initiated by a user of the computing device using a GUI widget (e.g., GUI widget 816 or 818 of FIG. 8A) of the plug-in window.

In a next step 440, the computing device receives a user input for unflagging all of the "flagged" chip images. In response to the user input of step 440, step 442 is performed where the marks or annotations are removed from the "flagged" chip images. Subsequently, step 444 is performed where the method ends or other processing is performed.

Figure 32:
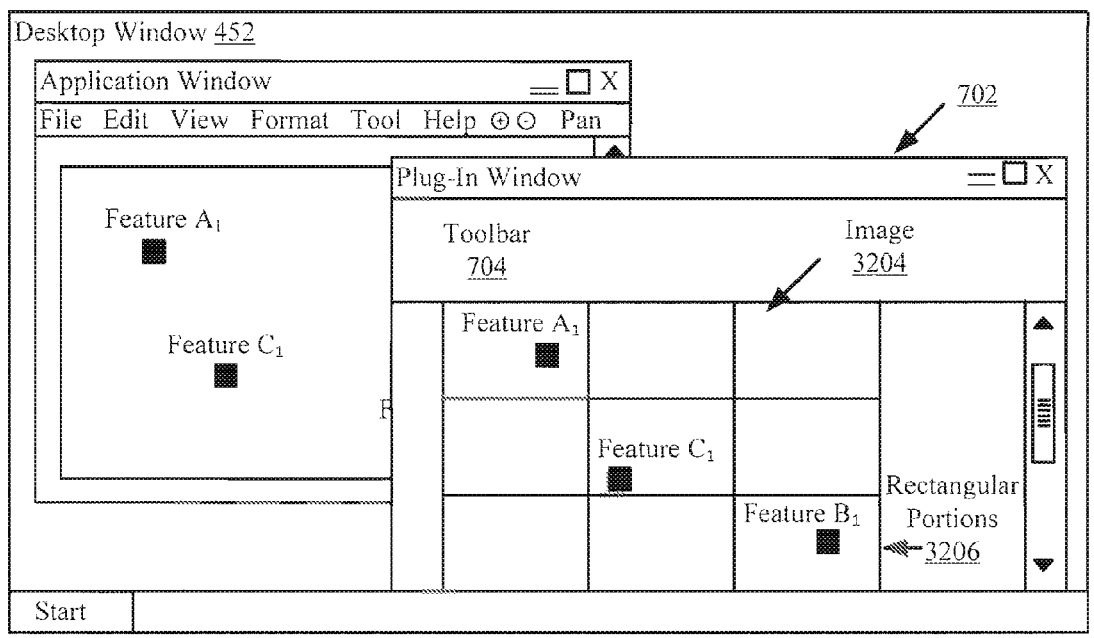
FIG. 32 is a schematic illustration of an exemplary plug-in window that is useful for understanding the present invention.

Referring now to FIG. 32, there is a schematic illustration of an exemplary plug-in window 702 in which an image 3204 is displayed. As shown in FIG. 32, the image 3204 has been segmented into a plurality of rectangular portions 3206. The rectangular portions 3206 of the image 3204 can be manipulated using one or more of the plug-in functions described above in relation to FIGS. 1-31. For example, a zoom level of scale or resolution for each of the portions 3206 of the image 3204 can be manipulated separately by a user of the computing device using GUI widgets (not shown in FIG. 32) of the plug-in window 702. Also, a user can "check" or "flag" one or more of the portions 3206 of the image 3204 in the same or similar manner as that discussed above. This "image grid" function of the feature analysis plug-in can be enabled and disabled by a user using a GUI widget (not shown in FIG. 32) of the plug-in window 3202. In this display mode, contiguous areas of the source image are displayed contiguously in the "feature analysis plug-in" and no stored feature class is used in creating the chip images. Furthermore, the total number of portions of the image that should be generated and displayed can be specified by a user using a "grid size" GUI widget (e.g., GUI widget 808 of FIG. 8A) of the plug-in window.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for efficient spatial feature data analysis, comprising:
receiving, by a computing device, a user input for selecting a feature contained in an area of interest within a first image via a user-software interaction directly with the first image displayed in a display area of an application window, the first image comprising a plurality of features where the feature selected by the user input and at least one other feature of the plurality of features comprise multi-dimensional representations of objects which have at least one attribute in common;
in response to the user-software interaction, simultaneously and dynamically generating, by the computing device, a plurality of chip images using image data defining the first image and data specifying at least one attribute of the feature selected by the user input, each of the chip images comprising at least one of a panned-only view, a zoomed-only view, and a panned-and-zoomed view of the first image including at least one first feature of the plurality of features that is different from second features of the plurality of features which are contained in all other chip images, where the first and second features have at least one attribute in common; and
concurrently displaying, by the computing device, an array comprising the plurality of chip images in a plug-in window.

2. The method according to claim 1, wherein the array comprises a grid having a predefined grid size.

3. The method according to claim 2, further comprising changing, by the computing device, the grid size in response to a user input selecting a new grid size from a plurality of grid sizes.

4. The method according to claim 2, further comprising:
generating, by the computing device, a plurality of pages of chip images for the first image when a selected feature class has more than a maximum number of features that can fit in the grid of the pre-defined grid size;
wherein each of the plurality of pages of chip images comprises chip images that are different than the chip images of all other pages of the plurality of pages of chip images.

5. The method according to claim 4, further comprising paging forward or backward, by the computing device, through the plurality of pages of chip images in response to a user-software interaction.

6. The method according to claim 4, further comprising changing, by the computing device, visual contents of the plug-in window from a first page of the plurality of pages of chip images to a second user-specified one of the plurality of pages of chip images.

7. The method according to claim 1, further comprising displaying, in the plug-in window, information relating to an attribute of a feature contained in a. selected one of the plurality of chip images displayed in the plug-in window.

8. The method according to claim 1, further comprising automatically updating, by the computing device, a view of the first image displayed in an application window to include at least the visual contents of a selected one of the plurality of chip images displayed in the plug-in window.

9. The method according to claim 1, further comprising:
sorting, by the computing device, the plurality of chip images in an ascending or descending order based on at least one user-specified feature attribute; and
displaying, in the plug-in window, the plurality of chip images in the ascending or descending order.

10. The method according to claim 1, further comprising:
filtering, by the computing device, the plurality of chip images based on at least one user-specified feature attribute; and
displaying, by the computing device, the plurality of chip images which have been filtered in the plug-in window.

11. The method according to claim 1, further comprising randomly selecting and displaying, by the computing device, a user-specified amount of the plurality of chip images.

12. The method according to claim 1, further comprising:
changing, by the computing device, a zoom level of scale of the plurality of chip images from a first zoom level of scale to a second zoom level of scale in response to a user-software interaction;
wherein the second zoom level of scale is a user-specified zoom level of scale, a pre-defined fixed zoom level of scale or a best-fit zoom level of scale.

13. The method according to claim 1, further comprising panning, by the computing device, the first image displayed in an application window such that a feature contained in a user-selected one of the plurality of chip images is shown in the application window.

14. The method according to claim 1, further comprising zooming, by the computing device, the first image displayed in an application window such that a feature contained in a user-selected one of the plurality of chip images is shown in the application window at a pre-defined zoom level of resolution.

15. The method according to claim 1, further comprising cycling, by the computing device, through a plurality of pages of chip images that were generated using the first image and at least one second image different from the first image.

16. The method according to claim 1, further comprising generating and displaying, by the computing device, at least one chip image comprising an area that is common to the first image and at least one second image.

17. The method according to claim 1, further comprising adding, by the computing device, a mark or annotation to at least one of the plurality of chip images in response to a user-software interaction.

18. The method according to claim 1, further comprising adding, by the computing device, a mark or annotation to all of the plurality of chip images that precede or succeed a selected one of the plurality of chip images in a sorted order.

19. The method according to claim 1, further comprising exporting, by the computing device, at least one of the plurality of chip images that has a mark or annotation added thereto to a file or table.

20. The method according to claim 1, further comprising storing, by the computing device, various settings that a user sets for at least one of a plurality of feature classes during at least one session.

21. A system, comprising:
at least one electronic circuit which
receives a user input for selecting a feature contained in an area of interest within a first image via a user-software interaction directly with the first image displayed in a display area of an application window, the image region comprising a plurality Of features, where the feature selected by the user input and at least one other feature of the plurality of features comprise multi-dimensional representations of objects which have at least one attribute in common;
in response to the reception of the user input, simultaneously and dynamically generates a plurality of chip images using image data defining the first image and data specifying at least attribute of the feature selected by the user input, each of the chip images comprising at least one of a panned-only view, a zoomed-only view, and a panned-and-zoomed view of the first image including at least one first feature of the plurality of features that is different from second features of the plurality of features which are contained in all other chip images, where the first and second features have at least one attribute in common, and
concurrently displays an array comprising the plurality of chip images in a plug-in window.

22. The system according to claim 21, wherein the array comprises a grid having a predefined grid size.

23. The system according to claim 22, wherein the electronic circuit is further changes the grid size in response to a user input selecting a new grid size from a plurality of grid sizes.

24. The system according to claim 22, wherein the electronic circuit further:
generates a plurality of pages of chip images for the first image when a selected feature class has more than a maximum number of features that can fit in the grid of the pre-defined grid size;
wherein each of the plurality of pages of chip images comprises chip images that are different than the chip images of all other pages of the plurality of pages of chip images.

25. The system according to claim 24, wherein the electronic circuit further to pages forward or backward through the plurality of pages of chip images in response to a user-software interaction.

26. The system according to claim 24, Wherein the electronic circuit further changes visual contents of the plug-in window from a first page of the plurality of pages of chip images to a second user-specified one of the plurality of pages of chip images.

27. The system according to claim 21, wherein the electronic circuit further displays in the plug-in window information relating to an attribute of a feature contained in a selected one of the plurality of chip images displayed in the plug-in window.

28. The system according to claim 21, wherein the electronic circuit further automatically updates a view of the first image displayed in an application window to include at least the visual contents of a selected one of the plurality of chip images displayed in the plug-in window.

29. The system according to claim 21, wherein the electronic circuit further:
sorts the plurality of chip images in an ascending order or descending order based on at least one user-specified feature attribute; and
displays the plurality of chip images in the ascending or descending order.

30. The system according to claim 21, wherein the electronic circuit further:
filters the plurality of chip images based on at least one user-specified feature attribute; and
displays the plurality of chip images which have been filtered in the plug-in window.

31. The system according to claim 21, wherein the electronic circuit further randomly selects and displays a user-specified amount of the plurality of chip images.

32. The system according to claim 21, Wherein the electronic circuit further:
changes a zoom level of scale of the plurality of chip images from a first zoom level of scale to a second zoom level of scale in response to a user-software interaction;
wherein the second zoom level of scale is a user-specified zoom level of scale, a predefined fixed zoom level of scale or a best-fit zoom level of scale.

33. The system according to claim 21, wherein the electronic circuit further pans the first image displayed in an application window such that a feature contained in a user-selected one of the plurality of chip images is shown in the application window.

34. The system according to claim 21, wherein the electronic circuit further zooms the first image displayed in an application window such that a feature contained in a user-selected one of the plurality of chip images is shown in the application window at a pre-defined zoom level of resolution.

35. The system according to claim 21, wherein the electronic circuit further cycles through a plurality of pages of chip images that were generated using the first image and at least one second image different from the first image.

36. The system according to claim 21, wherein the electronic circuit further generates and display at least one chip image comprising at least one area that is common to the first image and at least one second image.

37. The system according to claim 21, wherein the electronic circuit further adds a mark or annotation to at least one of the plurality of chip images in response to a user-software interaction.

38. The system according to claim 21, wherein the electronic circuit further adds a mark or annotation to all of the plurality of chip images that precede or succeed a selected chip image of the plurality of chip images in a sorted order.

39. The system according to claim 21, wherein the electronic circuit further exports at least one of the plurality of chip images that has a mark or annotation added thereto to a file or table.

40. The system according to claim 21, wherein the electronic circuit further store various settings that a user sets for at least one of a plurality of feature classes during at least one session.

* * * * *